(12) United States Patent
Yoshima et al.

(10) Patent No.: US 10,461,375 B2
(45) Date of Patent: Oct. 29, 2019

(54) SECONDARY BATTERY, BATTERY PACK, AND VEHICLE

(71) Applicant: KABUSHIKI KAISHA TOSHIBA, Minato-ku (JP)

(72) Inventors: Kazuomi Yoshima, Yokohama (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 85 days.

(21) Appl. No.: 15/692,334

(22) Filed: Aug. 31, 2017

(65) Prior Publication Data

US 2018/0269537 A1 Sep. 20, 2018

(30) Foreign Application Priority Data

Mar. 17, 2017 (JP) ................. 2017-052749

(51) Int. Cl.
*H01M 10/24* (2006.01)
*H01M 10/42* (2006.01)
(Continued)

(52) U.S. Cl.
CPC ..... *H01M 10/4257* (2013.01); *H01M 2/1072* (2013.01); *H01M 4/02* (2013.01);
(Continued)

(58) Field of Classification Search
CPC ............. H01M 10/4257; H01M 10/36; H01M 10/0585; H01M 2/1072; H01M 2300/0085; H01M 2300/0002; H01M 2220/20
See application file for complete search history.

(56) References Cited

U.S. PATENT DOCUMENTS 6,183,900 B1 2/2001 Bronoel et al.
2011/0086266 A1 4/2011 Kondo
(Continued)

FOREIGN PATENT DOCUMENTS

JP 2000-77073 A 3/2000
JP 2001-500661 A 1/2001
(Continued)

OTHER PUBLICATIONS

Chang, Z. et al. A lithium ion battery using an aqueous electrolyte solution. Sci. Rep. 6, 28421; doi: 10.1038/srep28421 (2016).*
(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, a negative electrode, and an aqueous electrolyte. The aqueous electrolyte includes a first aqueous electrolyte and a second aqueous electrolyte. The first aqueous electrolyte is in contact with at least part of the positive electrode and contains lithium ions. The second aqueous electrolyte is in contact with at least part of the negative electrode and contains lithium ions. The concentration of lithium ions contained in the second aqueous electrolyte is higher than the concentration of lithium ions contained in the first aqueous electrolyte.

19 Claims, 7 Drawing Sheets

(51) Int. Cl.
*H01M 2/10* (2006.01)
*H01M 10/0585* (2010.01)
*H01M 10/36* (2010.01)
*H01M 4/02* (2006.01)

(52) U.S. Cl.
CPC ....... *H01M 10/0585* (2013.01); *H01M 10/36* (2013.01); *H01M 2220/20* (2013.01); *H01M 2300/0002* (2013.01); *H01M 2300/0085* (2013.01)

(56) References Cited

U.S. PATENT DOCUMENTS

| | | |
|---|---|---|
| 2011/0281173 A1 | 11/2011 | Singh et al. |
| 2014/0057156 A1 | 2/2014 | Hasenkox |
| 2014/0356731 A1 | 12/2014 | Niwa et al. |
| 2017/0271682 A1 | 9/2017 | Matsuno et al. |
| 2017/0271717 A1 | 9/2017 | Yamashita et al. |

FOREIGN PATENT DOCUMENTS

| | | | |
|---|---|---|---|
| JP | WO 2013/108309 A1 | 7/2013 | |
| JP | 2014-170715 A | 9/2014 | |
| JP | 5800913 B2 | 10/2015 | |
| JP | 5892434 B2 | 3/2016 | |
| JP | 2016-48650 A | 4/2016 | |
| JP | 2017-174809 A | 9/2017 | |
| JP | 2017-174810 A | 9/2017 | |
| WO | WO 2010/052542 * | 5/2010 | ............ H01M 10/04 |
| WO | WO 2010/150377 A1 | 12/2010 | |
| WO | WO 2016/114141 A1 | 7/2016 | |
| WO | WO 2017/135323 A1 | 8/2017 | |

OTHER PUBLICATIONS

Liumin Suo, et al., "Advanced High-Voltage Aqueous Lithium-Ion Battery Enabled by "Water-in-Bisalt" Electrolyte", Wiley-VCH, Angewandte Chem. Int. Ed., vol. 55, 2016, pp. 7136-7141.

S. Liu, et al., "Rechargeable Aqueous Lithium-Ion Battery of $TiO_2/LiMn_2O_4$ with a High Voltage", Journal of the Electrochemical Society, vol. 158 No. 12, 2011, pp. A1490-A1497.

\* cited by examiner

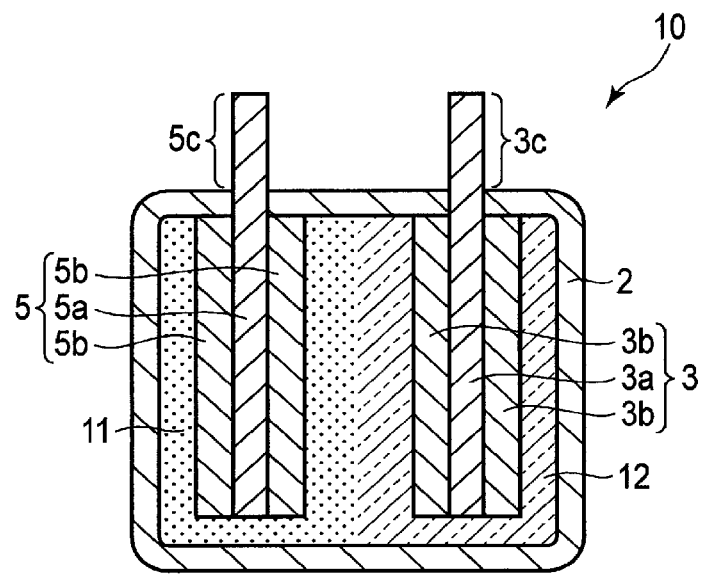
F I G. 1
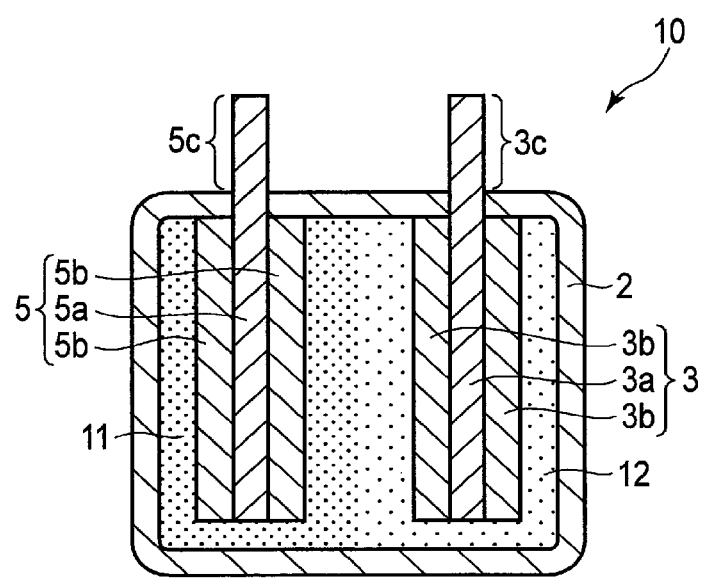
F I G. 2

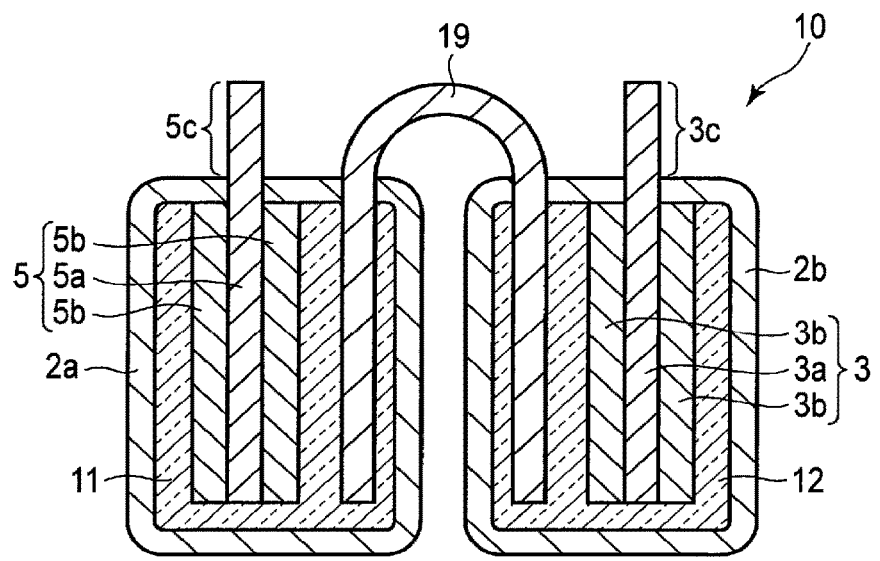
F I G. 5
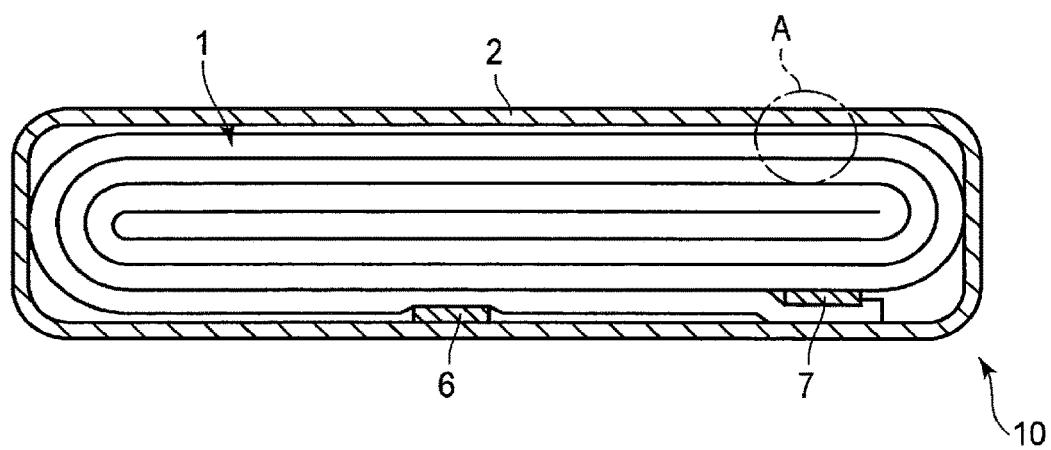
F I G. 6

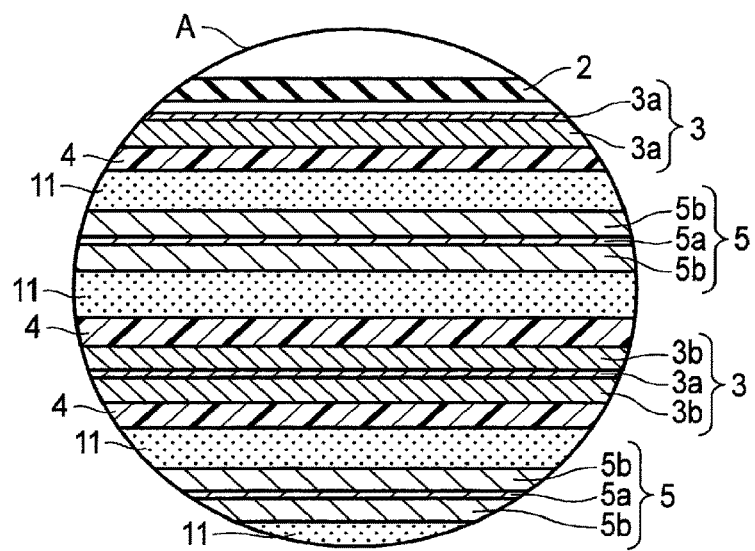
F I G. 7
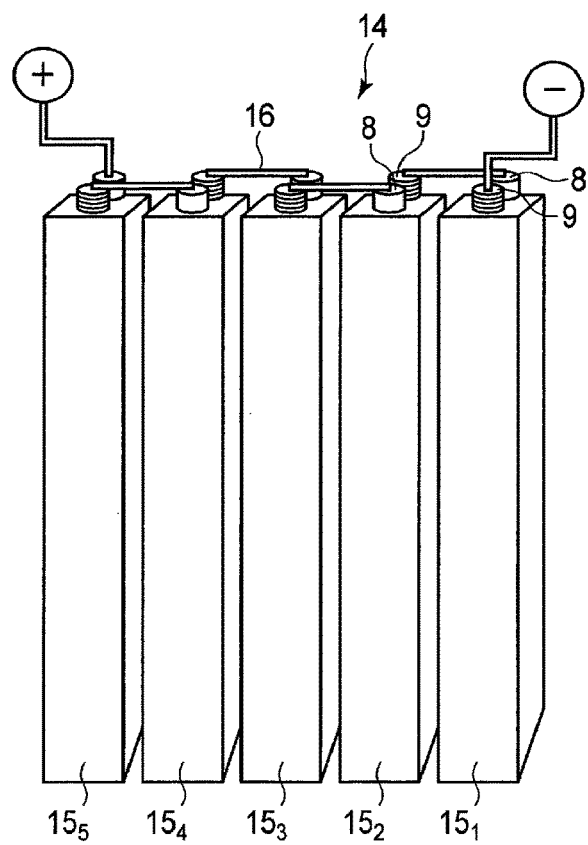
F I G. 8

SECONDARY BATTERY, BATTERY PACK, AND VEHICLE

CROSS-REFERENCE TO RELATED APPLICATIONS

This application is based upon and claims the benefit of priority from Japanese Patent Application No. 2017-052749, filed Mar. 17, 2017, the entire contents of which are incorporated herein by reference.

FIELD

Embodiments described herein relate generally to a secondary battery, a battery pack, and a vehicle.

BACKGROUND

A nonaqueous electrolyte battery, particularly, a lithium secondary battery using a carbon material or lithium titanium oxide as a negative electrode active material and a layered oxide containing nickel, cobalt, and manganese as positive electrode active materials has already been put into practical use as a power supply in a broad field. The form of such a nonaqueous electrolyte battery widely ranges from a small battery for various kinds of electronic devices to a large battery for an electric automobile. These lithium secondary batteries use, as the electrolytic solution, a nonaqueous organic solvent containing ethylene carbonate or methyl ethyl carbonate, unlike a nickel hydrogen battery or a lead storage battery. Electrolytic solutions using these solvents have high resistance to oxidation and high resistance to reduction as compared to an aqueous electrolyte solution, and electrolysis of the solvents hardly occurs. For this reason, a nonaqueous lithium secondary battery can implement a high electromotive force of 2 to 4.5 V.

On the other hand, since many organic solvents are combustible, the safety of a secondary battery using an organic solvent readily becomes lower than that of a secondary battery using an aqueous solution in principle. Although various measures are taken to improve the safety of a lithium secondary battery using an electrolytic solution containing an organic solvent, they are not necessarily enough. In addition, a nonaqueous lithium secondary battery requires a dry environment in its manufacturing process, and the manufacturing cost inevitably rises. Furthermore, since an electrolytic solution containing an organic solvent is poor in conductivity, the internal resistance of the nonaqueous lithium secondary battery readily becomes high. These problems are great disadvantages for a large storage battery used in an electronic automobile, a hybrid electronic automobile, or an electric power storage for which the battery safety and the battery cost are of importance.

To solve these problems, forming an electrolytic solution as an aqueous solution has been examined. In an aqueous electrolytic solution, a potential range in which charge and discharge of a battery are executed needs to be limited to a potential range in which an electrolysis reaction of water contained as a solvent does not occur. For example, when lithium manganese oxide is used as a positive electrode active material, and lithium vanadium oxide is used as a negative electrode active material, electrolysis of water can be avoided. With the combination of these materials, an electromotive force of about 1 to 1.5 V is obtained. However, a sufficient energy density as a battery can hardly be obtained.

In addition, when lithium manganese oxide is used as a positive electrode active material, and lithium titanium oxide is used as a negative electrode active material, an electromotive force of about 2.7 V is obtained theoretically, and the battery can be attractive from the viewpoint of energy density as well. Such a combination of a positive electrode active material and a negative electrode active material can provide a high life characteristic when an organic electrolytic solution is used, and has already been put into practical use. However, when an aqueous electrolytic solution is used, the potential of lithium insertion/extraction of lithium titanium oxide is about 1.5 V (vs. Li/Li$^+$). Hence, there is a problem that electrolysis of the aqueous electrolytic solution readily occurs. On the other hand, even in lithium manganese oxide of the positive electrode, a gas is generated due to oxidation of cations in the aqueous solution, and satisfactory charge is impossible.

BRIEF DESCRIPTION OF THE DRAWINGS

FIG. 1 is a sectional view schematically showing an example of a secondary battery according to the first embodiment;

FIG. 2 is a sectional view schematically showing another example of the secondary battery according to the first embodiment;

FIG. 5 is a sectional view schematically showing still another example of the secondary battery according to the first embodiment;

FIG. 6 is a sectional view schematically showing still another example of the secondary battery according to the first embodiment;

FIG. 7 is an enlarged sectional view of a portion A in FIG. 6;

FIG. 8 is a perspective view schematically showing an example of a battery module according to the first embodiment;

DETAILED DESCRIPTION

Figure 3:
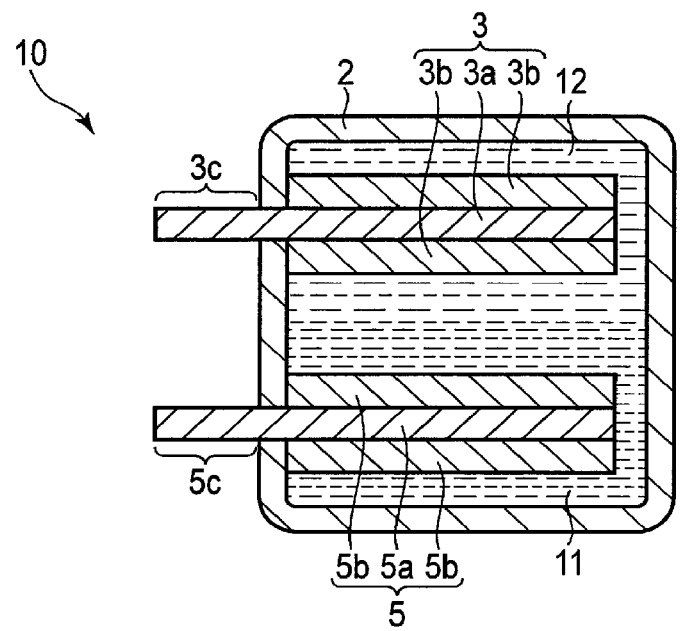
FIG. 3 is a sectional view schematically showing still another example of the secondary battery according to the first embodiment.

According to the first embodiment, a secondary battery is provided. The secondary battery includes a positive electrode, a negative electrode, and an aqueous electrolyte. The aqueous electrolyte includes a first aqueous electrolyte and a second aqueous electrolyte. The first aqueous electrolyte is in contact with at least part of the positive electrode and contains lithium ions. The second aqueous electrolyte is in contact with at least part of the negative electrode and contains lithium ions. The concentration of lithium ions contained in the second aqueous electrolyte is higher than the concentration of lithium ions contained in the first aqueous electrolyte.

According to the second embodiment, a battery pack is provided. The battery pack includes a secondary battery according to the first embodiment.

According to the third embodiment, a vehicle is provided. The vehicle includes a battery pack according to the second embodiment.

Embodiments will now be described with reference to the accompanying drawings. Note that the same reference numerals denote the same parts throughout the embodiments, and a repetitive description thereof will be omitted. The drawings are schematic views for explaining the embodiments and promoting understanding of the embodiments. Shapes, sizes, ratios, and the like are different from those in an actual device, and the design can appropriately be changed in consideration of the following explanation and known techniques.

First Embodiment

According to the first embodiment, a secondary battery is provided. The secondary battery includes a positive electrode, a negative electrode, and an aqueous electrolyte. The aqueous electrolyte includes a first aqueous electrolyte and a second aqueous electrolyte. The first aqueous electrolyte is in contact with at least part of the positive electrode and contains lithium ions. The second aqueous electrolyte is in contact with at least part of the negative electrode and contains lithium ions. The concentration of lithium ions contained in the second aqueous electrolyte is higher than the concentration of lithium ions contained in the first aqueous electrolyte.

The present inventors found that when an aqueous electrolyte is used as the electrolyte of a secondary battery, the reduction potential rises in both the positive electrode and the negative electrode as the concentration of lithium ions in the aqueous electrolyte becomes high.

Based on this finding, when the concentration of lithium contained in the electrolyte that the negative electrode contacts is made higher than the concentration of lithium contained in the electrolyte that the positive electrode contacts, the hydrogen overvoltage of the negative electrode rises, and the oxygen overvoltage of the positive electrode lowers. It is therefore possible to suppress hydrogen generation in the negative electrode and oxygen generation in the positive electrode. As a result, a secondary battery that is excellent in the charge-and-discharge efficiency and the life characteristic can be obtained.

The secondary battery according to this embodiment will be described below in detail.

The secondary battery can further include a partition, a separator, and a container member which is configured to store the positive electrode, the negative electrode, and the aqueous electrolyte in addition to the positive electrode, the negative electrode, and the aqueous electrolyte.

The aqueous electrolyte, the negative electrode, the positive electrode, the partition, the separator, and the container member will be described below in detail.

(1) Aqueous Electrolyte

The aqueous electrolyte contains, for example, a solvent containing water and lithium salt.

The aqueous electrolyte includes a first aqueous electrolyte that is in contact with at least part of the positive electrode, and a second aqueous electrolyte that is in contact with at least part of the negative electrode. The first aqueous electrolyte may be held by the positive electrode or impregnated in the positive electrode. The second aqueous electrolyte may be held by the negative electrode or impregnated in the negative electrode. Both the first aqueous electrolyte and the second aqueous electrolyte contain lithium ions. The aqueous electrolyte will be described below. The explanation of the aqueous electrolyte is independently applied to the first aqueous electrolyte and the second aqueous electrolyte, unless otherwise specified.

The solvent containing water may be pure water or a solution mixture and/or a solvent mixture of water and a material other than water.

The aqueous electrolyte preferably contains 1 mol or more of solvent containing water with respect to 1 mol of electrolyte salt that is a solute. The amount of the solvent containing water with respect to 1 mol of electrolyte salt is preferably 3.5 mol or more.

That the aqueous electrolyte contains water can be confirmed by GC-MS (Gas Chromatography-Mass Spectrometry). The salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. The numbers of moles of the solute and the solvent can be calculated by measuring the specific gravity of the aqueous electrolyte.

An example of the aqueous electrolyte contains an aqueous solution and a gel aqueous electrolyte. The aqueous solution is an aqueous solution prepared by, for example, dissolving lithium salt in an aqueous solvent. The gel aqueous electrolyte is a gel aqueous electrolyte prepared by, for example, compositing a polymeric material in the aqueous solution. The polymeric material includes at least one material selected from the group consisting of, for example, polyvinylidene fluoride (PVdF), polyacrylonitrile (PAN), and polyethylene oxide (PEO).

The aqueous solution is prepared by, for example, dissolving lithium salt in an aqueous solvent at a concentration of 1 to 10 mol/L. To suppress electrolysis of the aqueous electrolyte, pH can be adjusted by adding LiOH, $Li_2SO_4$, or the like. The pH is preferably is 3 to 13, and more preferably 4 to 12.

Examples of lithium salt are LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalato)borate). The lithium salt to be used may include one type or two or more types of lithium salts. The aqueous electrolyte may contain a salt other than lithium salt. An example of the salt other than lithium salt is $ZnSO_4$.

As an anionic species in the electrolytic solution in which lithium salt is dissolved, at least one anionic species selected from the group consisting of a chlorine ion ($Cl^-$), hydroxide ion ($OH^-$), sulfate ion ($SO_4^{2-}$), and nitrate ion ($NO_3^-$) preferably exists.

The concentration of lithium ions contained in the second aqueous electrolyte that is in contact with the negative electrode is higher than the concentration of lithium ions contained in the first aqueous electrolyte that is in contact with the positive electrode. This can suppress gas generation in the positive electrode and the negative electrode, as described above. For this reason, a secondary battery including this structure can achieve an excellent charge-and-discharge efficiency and life characteristic.

A concentration C1 of lithium ions contained in the first aqueous electrolyte is, for example, 0.1 mol/L to 15 mol/L, and is preferably 1 mol/L to less than 5 mol/L. If the concentration C1 of lithium ions contained in the first aqueous electrolyte falls within this range, generation of oxygen in the positive electrode can easily be suppressed.

A concentration C2 of lithium ions contained in the second aqueous electrolyte is, for example, 0.1 mol/L to 15 mol/L, and is preferably 5 mol/L to 12 mol/L. If the concentration C2 of lithium ions contained in the second aqueous electrolyte falls within this range, generation of hydrogen in the negative electrode can easily be suppressed.

The ratio of the concentration C2 of lithium ions contained in the second aqueous electrolyte to the concentration C1 of lithium ions contained in the first aqueous electrolyte is not particularly limited as long as it is higher than 1, and is, for example, 2 to 11.

The concentration of lithium ions contained in the aqueous electrolyte can be measured in accordance with the following procedure.

The lithium ion concentration is measured by emission spectrochemical analysis using ICP (Inductively Coupled Plasma) as a light source. More specifically, a sample solution is atomized and introduced into Ar plasma. Light emitted when an excited element returns to the ground state is separated, thereby performing qualitative analysis of the element based on a wavelength and quantitative analysis of the element based on an intensity. If the aqueous electrolyte is, for example, a gel containing a polymeric material, the gel is liquefied by pyrolysis, thereby obtaining a sample solution for the measurement. The ratio of water to lithium can be known from the result, and the concentration of lithium ions can be calculated.

A first anionic species contained in the first aqueous electrolyte preferably includes sulfate ions ($SO_4^{2-}$). The first anionic species contained in the first aqueous electrolyte may include only sulfate ions ($SO_4^{2-}$). Since the sulfate ions are hardly oxidized, it is possible to suppress generation of a gas and oxygen derived from anions which is caused by oxidative degradation in the positive electrode. A second anionic species contained in the second aqueous electrolyte preferably includes at least one species selected from the group consisting of bis(trifluoromethanesulfonyl)imide ions and bis(fluorosulfonyl)imide ions. The second anionic species contained in the second aqueous electrolyte may include only one species selected from the group consisting of TFSI and FSI. Since TFSI and FSI can suppress electrolysis on the negative electrode surface, it is possible to suppress generation of hydrogen. If the above-described salt is used as lithium salt used in the first aqueous electrolyte and the second aqueous electrolyte, gas generation in the positive electrode and the negative electrode can effectively be suppressed. As a result, a secondary battery with an excellent charge-and-discharge efficiency and a long life can be obtained.

If the secondary battery does not include a partition to be described later, the first aqueous electrolyte and the second aqueous electrolyte can be prevented from mixing by using a gel aqueous electrolyte as at least one of the first aqueous electrolyte and the second aqueous electrolyte.

To manufacture a secondary battery in which at least one of the first aqueous electrolyte and the second aqueous electrolyte is a gel aqueous electrolyte, for example, after the positive electrode is produced, the first aqueous electrolyte in a gel state is applied to the positive electrode. If the first aqueous electrolyte is a liquid, the second aqueous electrolyte in a gel state is applied to the negative electrode. Application of the gel aqueous electrolyte can be done by, for example, immersing the manufactured positive electrode or negative electrode in the gel aqueous electrolyte.

Even if the secondary battery does not include a partition, and both the first aqueous electrolyte and the second aqueous electrolyte are liquids, the two types of electrolytes can be separated using a specific type of salt as the lithium salt contained in each electrolyte. The secondary battery according to the embodiment includes a form in which both the first aqueous electrolyte and the second aqueous electrolyte are liquids.

If the first and second aqueous electrolytes are liquids, the lithium salt contained in the first aqueous electrolyte is at least one salt selected from the group consisting of, for example, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalato)borate). The lithium salt contained in the second aqueous electrolyte is at least one salt selected from the group consisting of, for example, LiCl, LiBr, LiOH, $Li_2SO_4$, and $LiNO_3$. If the above-described lithium salts are used as the first and second aqueous electrolytes, the first aqueous electrolyte and the second aqueous electrolyte can be separated even if they are liquids. Probable factors in this are, for example, that the specific gravity of the first aqueous electrolyte and that of the second aqueous electrolyte are different, and that the solvation state of water molecules to lithium ions is different between the first aqueous electrolyte and the second aqueous electrolyte.

The relationship representing that the concentration of lithium ions contained in the second aqueous electrolyte is higher than the concentration of lithium ions contained in the first aqueous electrolyte does not change even if the secondary battery is charged or discharged.

If the secondary battery is charged, lithium ions contained in the first aqueous electrolyte that is in contact with the positive electrode apparently move to the second aqueous electrolyte that is in contact with the negative electrode. That is, if the secondary battery is charged, the concentration of lithium ions contained in the first aqueous electrolyte lowers, and the concentration of lithium ions contained in the second aqueous electrolyte rises. In other words, the ratio of the concentration of lithium ions contained in the second aqueous electrolyte to the concentration of lithium ions contained in the first aqueous electrolyte becomes higher than that before the charge.

In the secondary battery according to the embodiment, even if, for example, the charge is performed until the charge state (SOC) reaches 80%, or even if the charge is performed under the condition of 10 C, the concentration of lithium ions contained in the second aqueous electrolyte is higher than the concentration of lithium ions contained in the first aqueous electrolyte.

On the other hand, if the secondary battery is discharged, lithium ions contained in the second aqueous electrolyte that is in contact with the negative electrode apparently move to the first aqueous electrolyte that is in contact with the positive electrode. That is, if the secondary battery is discharged, the concentration of lithium ions contained in the second aqueous electrolyte lowers, and the concentration of lithium ions contained in the first aqueous electrolyte rises. In other words, the ratio of the concentration of lithium ions contained in the second aqueous electrolyte to the concentration of lithium ions contained in the first aqueous electrolyte becomes lower than that before the discharge.

Even if the secondary battery is discharged, the ratio of the concentration of lithium ions contained in the second aqueous electrolyte to the concentration of lithium ions contained in the first aqueous electrolyte remains higher than 1. Hence, the secondary battery after charge or discharge can also suppress gas generation and achieve an excellent charge-and-discharge efficiency and life characteristic.

In the secondary battery according to the embodiment, even if, for example, the discharge is performed until the charge state (SOC) reaches 10%, or even if the discharge is performed under the condition of 0.5 C, the concentration of lithium ions contained in the second aqueous electrolyte is higher than the concentration of lithium ions contained in the first aqueous electrolyte.

(2) Partition

The secondary battery according to this embodiment may include a partition that separates the first aqueous electrolyte and the second aqueous electrolyte or may not have such a partition. The partition can prevent a negative electrode 3 and a positive electrode 5 from coming into contact with each other. The partition can also prevent the first aqueous electrolyte and the second aqueous electrolyte from mixing due to diffusion. On the other hand, the partition never impedes electrical connection between the first aqueous electrolyte and the second aqueous electrolyte because it can pass ions. The partition is, for example, an ion exchange membrane or a solid electrolyte.

The ion exchange membrane is, for example, a cation-exchange membrane with monovalent ion permselectivity. If the cation-exchange membrane is used, only lithium cations selectively permeate through the ion exchange membrane. Other ions contained in the aqueous electrolyte, for example, an anionic species derived from lithium salt does not permeate through the cation-exchange membrane.

The solid electrolyte contains, for example, an inorganic compound with a lithium ion conductivity of $10^{-10}$ S/cm or more. In a case in which the solid electrolyte is used as well, it is possible to obtain the same effect as in a case in which the ion exchange membrane is used.

The inorganic compound with a lithium ion conductivity of $10^{-10}$ S/cm or more is at least one material selected from the group consisting of, for example, $Li_2SeP_2S_5$-based glass ceramics that is sulfide-based glass, an inorganic compound having a perovskite structure, an inorganic compound having an LiSICON structure, LATP having a NASICON skeleton, LIPON in an amorphous state, and an inorganic compound having a garnet structure.

The solid electrolyte is preferably an oxide such as LATP($Li_{1+x}Al_xTi_{2-x}(PO_4)_3$) ($0.1 \leq x \leq 0.4$) having a NASICON skeleton, LIPON($Li_{2.9}PO_{3.3}N_{0.46}$) in an amorphous state, or garnet-type $Li_7La_3Zr_2O_{12}$ (LLZ).

In particular, the solid electrolyte preferably includes the inorganic compound having the garnet structure. The inorganic compound having the garnet structure is preferable because it has a high Li ion conductivity, a high reduction resistance, and a wide electrochemical window. Examples of the inorganic compound having the garnet structure are $Li_{5+x}A_yLa_{3-y}M_2O_{12}$ (A is at least one material selected from the group consisting of Ca, Sr, and Ba, and M is at least one material selected from the group consisting of Nb and Ta), $Li_3M_{2-x}Zr_2O_{12}$ (M is at least one material selected from the group consisting of Ta and Nb), $Li_{7-3x}Al_xLa_3Zr_3O_{12}$, and $Li_7La_3Zr_2O_{12}$ (LLZ). In the above materials, x is, for example, 0 to 0.8, and preferably, 0 to 0.5, and y is, for example, 0 to 2. The inorganic compound having the garnet structure may include one of these compounds or may include a mixture of two of them. In particular, $Li_{6.25}Al_{0.25}La_3Zr_3O_{12}$ and $Li_7La_3Zr_2O_{12}$ are excellent in discharge performance and cycle life performance because they have a high ion conductivity and are electrochemically stable.

(3) Negative Electrode

The negative electrode includes a negative electrode current collector, and a negative electrode active material layer carried on one or both surfaces of the negative electrode current collector and containing an active material, a conductive agent, and a binder.

The negative electrode active material includes, for example, at least one of titanium-containing oxides such as titanium oxide, lithium titanium oxide, niobium titanium oxide, and sodium niobium titanium oxide. The Li insertion potential of the titanium-containing oxide preferably ranges from 1.2 V (vs. Li/Li$^+$) to 2.0 V (vs. Li/Li$^+$). The negative electrode active material can include at least one of the titanium-containing oxides.

Titanium oxides include, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ ($0 \leq x \leq 1$). In addition, the structure of titanium oxide having a monoclinic structure before charge can be expressed as $TiO_2(B)$.

Lithium titanium oxides include, for example, a lithium titanium oxide having a spinel structure (for example, the general formula is $Li_{4+x}Ti_5O_{12}$ ($-1 \leq x \leq 3$)), an orthorhombic titanium oxide (for example, the general formula is $Li_{2+a}M(I)_{2-b}Ti_{6-c}M(II)_dO_{14+\sigma}$ ($0 \leq a \leq 6$, $0 < b < 2$, $0 < c < 6$, $0 < d < 6$, $-0.5 \leq \sigma \leq 0.5$, M(I) is at least one material selected from the group consisting of Sr, Ba, Ca, Mg, Na, Cs, and K, and M(II) is at least one material selected from the group consisting of Zr, Sn, V, Nb, Ta, Mo, W, Fe, Co, Mn, Al, and Y), a lithium titanium oxide having a ramsdellite structure (for example, $Li_{2+x}Ti_3O_7$ ($-1 \leq x \leq 3$)), $Li_{1+x}Ti_2O_4$ ($0 \leq x \leq 1$) $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$). The lithium titanium oxide may be a lithium titanium composite oxide in which a dopant is introduced.

Niobium titanium oxides include, for example, a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

Sodium niobium titanium oxides include, for example, an orthorhombic Na-containing niobium titanium composite oxide represented by the general formula $Li_{2+v}Na_{2-w}M1_xTi_{6-y-z}Nb_yM2_zO_{14+\delta}$ ($0 \leq c \leq 4$, $0 < w < 2$, $0 \leq x < 2$, $0 < y < 6$, $0 \leq z < 3$, $-0.5 \leq \delta \leq 0.5$, M1 includes at least one material selected from the group consisting of Cs, K, Sr, Ba, and Ca, and M2 includes at least one material selected from the group consisting of Zr, Sn, V, Ta, Mo, W, Fe, Co, Mn, and Al).

The negative electrode active material is preferably at least one material selected from the group consisting of a spinel-type lithium titanate (for example, $Li_4Ti_5O_{12}$) and an anatase-type titanium oxide (for example, $TiO_2$).

The negative electrode active material is contained in the negative electrode in a form of, for example, particles. The negative electrode active material particles can be single primary particles, secondary particles as an aggregate of primary particles, or a mixture of single primary particles and secondary particles. The shape of a particle is not particularly limited and can be, for example, spherical, elliptical, flat, or fibrous.

The average particle size (diameter) of the secondary particles of the negative electrode active material is preferably larger than 3 µm. The average particle size is more preferably larger than 5 to 20 µm. Within this range, the active material surface area is small, and hydrogen generation can be suppressed. On the other hand, the average particle size of the primary particles is preferably 1 µm or less. This makes the effect conspicuous in high input performance.

To stably operate the negative electrode active material in the aqueous electrolyte, the negative electrode current collector is preferably made of zinc.

Near a potential where a charge-and-discharge reaction for a titanium-containing oxide holds, hydrogen generation caused by electrolysis of the aqueous electrolyte readily occurs. In particular, electrolysis readily occurs on a current collector with high conductivity. Since the active material is easily separated from the current collector by bubbles of generated hydrogen, a continuous charge-and-discharge reaction to the active material hardly holds. Since zinc hardly causes hydrogen generation, separation of the active material layer from the current collector hardly occurs, and charge and discharge for the titanium-containing oxide are possible even at about 1.5 V in a standard lithium potential. Zinc is an inexpensive metal and is preferable from this viewpoint as well.

The same effect as described above can be obtained even if an element other than zinc is contained in the current collector. The element other than zinc is preferably at least one element selected from the group consisting of Ga, In, Bi, Tl, Sn, Pb, Ti, Al, Sn, and Pb. If these metals are contained as an alloy or single metals, the mechanical strength of the current collector is increased, and the workability can be improved. Additionally, if these metals are contained, it is possible to suppress electrolysis and more effectively suppress hydrogen generation. More preferably metals are Pb, Ti, and Al.

The same effect as described above can be obtained even if zinc, an alloy containing zinc, or a mixture of zinc and another metal exists on the current collector surface. More specifically, another substrate, for example, an Al substrate may be placed with these metals. Metals for the substrate are preferably Al, Fe, Cu, Ni, and Ti, and more preferably Al and Ti. The thickness of zinc that exists on the current collector surface preferably ranges from 0.1 µm to 10 µm. If the thickness is less than 0.1 µm, the effect of suppressing hydrogen generation is weak. If the thickness exceeds 10 µm, the adhesion to the metal of the substrate may lower. A more preferably range is from 0.2 µm to 2 µm.

The thickness of the negative electrode current collector ranges from, for example, 10 µm to 500 µm. If the thickness is less than 10 µm, tearing during the manufacture occurs at a high possibility. If the thickness exceeds 500 µm, the volume energy density of the battery may lower. The thickness of the negative electrode current collector is preferably 20 µm or less, and more preferably 15 µm or less.

The conductive agent is as necessary combined to improve the current collection performance and suppress the contact resistance between the active material and the current collector. Examples of the conductive agent include carbonaceous substances such as acetylene black, Ketjen black, graphite, and coke. As the conductive agent, these materials may be used singly, or in combination of two or more thereof.

The binder has a function of binding the active material, the conductive agent, and the current collector. As the binder, for example, at least one material selected from the group consisting of polytetrafluoroethylene (PTFE), polyvinylidene fluoride (PVdF), and a cellulose-based binder such as sodium carboxymethyl cellulose (CMC), fluorine-based rubber, styrene butadiene rubber (SBR), polypropylene (PP), polyethylene (PE), polyimide (PI), and polyacrylimide (PAI) can be used. However, the binder is not limited to these. As the binder, these materials may be used singly, or in combination of two or more thereof.

As for the combination ratio of the negative electrode active material, the conductive agent, and the binder in the negative electrode active material layer, preferably, the concentration of the negative electrode active material ranges from 80 wt % to 95 wt %, the concentration of the conductive agent ranges from 3 wt % to 18 wt %, and the concentration of the binder ranges from 2 wt % to 7 wt %. If the concentration of the conductive agent is less than 3 wt %, the current collection performance of the negative electrode active material layer may degrade, and the large-current performance of the battery may degrade. If the concentration of the binder is less than 2 wt %, the binding property between the negative electrode active material layer and the negative electrode current collector may degrade, and the cycle performance may degrade. On the other hand, from the viewpoint of increasing the capacity, the concentration of the conductive agent and that of the binder are preferably 18 wt % or less and 7 wt % or less, respectively.

The negative electrode can be produced by, for example, the following method. First, the negative electrode active material, the conductive agent, and the binder are suspended in an appropriate solvent to prepare a slurry. The slurry is applied to one or both surfaces of a negative electrode current collector. As the negative electrode current collector, a negative electrode current collector with a coating layer formed in advance by the above-described method is used. A negative electrode active material layer is formed by drying the coating on the negative electrode current collector. After that, the negative electrode current collector and the negative electrode active material layer formed thereon are pressed. As the negative electrode active material layer, a layer made of a negative electrode active material, a conductive agent, and a binder which are formed in pellets may be used.

(4) Positive Electrode

The positive electrode includes a positive electrode current collector, and a positive electrode active material layer carried on one or both surfaces of the positive electrode current collector and containing an active material, a conductive agent, and a binder.

The positive electrode current collector is made of, for example, a metal such as stainless steel, Al, or Ti. The positive electrode current collector has a form of, for example, a foil, a porous body, or a mesh. To prevent the current collector from being corroded by the reaction between the current collector and the electrolyte, the current collector surface may be covered with a dopant. The positive electrode current collector is preferably made of a material with high resistance to corrosion and oxidation, for example, a Ti foil.

As the positive electrode active material, materials allowing lithium ions to be inserted thereinto and extracted therefrom may be used. The positive electrode may contain one type of positive electrode active material or two or more types of positive electrode active materials. Examples of the positive electrode active material are a lithium manganese composite oxide, a lithium nickel composite oxide, a lithium cobalt composite oxide, a lithium cobalt aluminum composite oxide, a lithium nickel cobalt manganese composite oxide, a spinel-type lithium manganese nickel composite oxide, a lithium manganese cobalt composite oxide, a lithium iron oxide, lithium fluorinated iron sulfate, and a phosphate compound (for example, $Li_xFePO_4$ ($0 \le x \le 1$) $Li_xMnPO_4$ ($0 \le x \le 1$)) having an olivine crystal structure. The phosphate compound having an olivine crystal structure has excellent thermal stability.

Usable are, for example, a lithium manganese composite oxide such as $Li_xMn_2O_4$ or $Li_xMnO_2$, for example, a lithium nickel aluminum composite oxide such as $Li_xNi_{1-y}Al_yO_2$, for example, a lithium cobalt composite oxide such as $Li_xCoO_2$, for example, a lithium nickel cobalt composite oxide such as $Li_xNi_{1-y-z}Co_yMn_zO_2$, for example, a lithium manganese cobalt composite oxide such as $Li_xMn_yCo_{1-y}O_2$, for example, a spinel-type lithium manganese nickel composite oxide such as $Li_xMn_{2-y}Ni_yO_4$, for example, a lithium phosphorus oxide having an olivine structure such as $Li_xFePO_4$, or $Li_xCoPO_4$, and for example, fluorinated iron sulfate $Li_xFeSO_4F$. Here, x and y are preferably 0 to 1 unless otherwise specified.

Particularly, according to the lithium nickel aluminum composite oxide, the lithium nickel cobalt manganese composite oxide, and the lithium manganese cobalt composite oxide, it is possible to suppress the reaction with a nonaqueous electrolyte under a high temperature environment and largely improve the battery life. A lithium nickel cobalt manganese composite oxide that can be expressed as $Li_xNi_{1-y-z}Co_yMn_2O_2$ ($0 \le x \le 1.1$, $0 \le y \le 0.5$, $0 \le z \le 0.5$) is preferable. When the lithium nickel cobalt manganese composite oxide is used, a longer life under a higher temperature can be obtained.

The positive electrode active material is contained in the positive electrode in a form of, for example, particles. The positive electrode active material particles can be single primary particles, secondary particles as an aggregate of primary particles, or a mixture of single primary particles and secondary particles. The shape of a particle is not particularly limited and can be, for example, spherical, elliptical, flat, or fibrous.

The conductive agent is as necessary combined to improve the current collection performance and suppress the contact resistance between the active material and the current collector. Examples of the conductive agent include carbonaceous substances such as acetylene black, Ketjen black, graphite, and coke. As the conductive agent, these materials may be used singly, or in combination of two or more thereof.

The binder has a function of binding the active material, the conductive agent, and the current collector. As the binder, for example, at least one material selected from the group consisting of polytetrafluoroethylene (PTFE), polyvinylidene fluoride (PVdF), and a cellulose-based binder such as sodium carboxymethyl cellulose (CMC), fluorine-based rubber, styrene butadiene rubber (SBR), polypropylene (PP), polyethylene (PE), polyimide (PI), and polyacrylimide (PAI) can be used. However, the binder is not limited to these. As the binder, these materials may be used singly, or in combination of two or more thereof.

As for the combination ratio of the positive electrode active material, the conductive agent, and the binder in the positive electrode active material layer, preferably, the concentration of the positive electrode active material ranges from 80 wt % to 95 wt %, the concentration of the conductive agent ranges from 3 wt % to 18 wt %, and the concentration of the binder ranges from 2 wt % to 7 wt %. If the concentration of the conductive agent is 3 wt % or more, the above-described effect can be provided. If the concentration of the conductive agent is 18 wt % or less, decomposition of the electrolyte on the conductive agent surface saved under a high temperature can be reduced. If the concentration of the binder is 2 wt % or more, a sufficient electrode strength can be obtained. If the concentration of the binder is 7 wt % or less, the insulating portion of the electrode can be decreased.

(5) Separator

The separator is used to prevent the positive electrode and the negative electrode from coming into contact with each other and can be arranged between the positive electrode and the negative electrode. A separator having such a shape that allows the electrolyte to move between the positive electrode and the negative electrode is used.

The separator is made of an insulating material. More specifically, for example, a synthetic resin nonwoven fabric, a polyethylene porous film, a polypropylene porous film, or a cellulose-based separator can be used.

(6) Container Member

The container member can store the positive electrode, the negative electrode, and the aqueous electrolyte. The container member is, for example, a metal container or a laminated film container. The metal container is, for example, a resin container made of polyethylene and/or polypropylene, or a metal can made of nickel, iron, stainless steel, or Zn. The laminated film is a multilayer film including a stainless foil covered with a resin film. A resin contained in the resin film is, for example, a polymeric material such as polypropylene (PP), polyethylene (PE), nylon, or polyethylene terephthalate (PET).

The secondary battery according to this embodiment can be used in various forms such as a rectangular shape, a cylindrical shape, a flat type, a low-profile type, and a coin type. In addition, the secondary battery may have a bipolar structure. This provides an advantage to produce plural of cells connected in series by one cell.

An example of the secondary battery according to the embodiment will be described below with reference to the drawings.

A case in which the secondary battery includes no partition will be explained first with reference to FIGS. 1, 2, and 3. FIG. 1 is a sectional view schematically showing an example of a secondary battery according to the first embodiment. FIG. 2 is a sectional view schematically showing another example of the secondary battery according to the first embodiment. FIG. 3 is a sectional view schematically showing still another example of the secondary battery according to the first embodiment.

A secondary battery 10 shown in each of FIGS. 1, 2, and 3 includes a negative electrode 3 including a negative electrode current collector 3a and a negative electrode active material layer 3b, a positive electrode 5 including a positive electrode current collector 5a and a positive electrode active material layer 5h, a first aqueous electrolyte 11 that is in contact with the positive electrode, a second aqueous electrolyte 12 that is in contact with the negative electrode, and an container member 2. The negative electrode active material layer 3b is provided on part of both surfaces of the negative electrode current collector 3a. The positive electrode active material layer 5b is provided on part of both surfaces of the positive electrode current collector 5a. A portion of the negative electrode current collector 3a where the negative electrode active material layer 3b is not provided functions as a negative electrode tab 3c. A portion of the positive electrode current collector 5a where the positive electrode active material layer 5b is not provided functions as a positive electrode tab 5c.

The positive electrode 5 is stored in the container member 2 in a state in which the positive electrode tab 5c projects outward. The negative electrode 3 is stored in the container member 2 in a state in which the negative electrode tab 3c projects outward. The first aqueous electrolyte 11 and the second aqueous electrolyte 12 are stored in the container member 2.

The first aqueous electrolyte 11 included in the secondary battery 10 shown in FIG. 1 is a gel aqueous electrolyte. The second aqueous electrolyte 12 is a liquid aqueous electrolyte. The liquid aqueous electrolyte does not permeate into the gel aqueous electrolyte. Hence, in this case, the first aqueous electrolyte 11 and the second aqueous electrolyte 12 do not mix. The first aqueous electrolyte 11 may be a liquid aqueous electrolyte, and the second aqueous electrolyte 12 may be a gel aqueous electrolyte, although not illustrated.

As shown in FIG. 1, the first aqueous electrolyte 11 is preferably in contact with only the positive electrode 5 among the negative electrode 3 and the positive electrode 5. When the first aqueous electrolyte 11 having a relatively low lithium ion concentration is in contact with only the positive electrode 5, the positive electrode 5 is not in contact with the second aqueous electrolyte 12 having a relatively high lithium ion concentration. Hence, in this case, the effect of suppressing gas generation in the positive electrode improves.

Similarly, the second aqueous electrolyte 12 is preferably in contact with only the negative electrode 3 among the negative electrode 3 and the positive electrode 5. When the second aqueous electrolyte 12 having a relatively high lithium ion concentration is in contact with only the negative electrode 3, the negative electrode 3 is not in contact with the first aqueous electrolyte 11 having a relatively low lithium ion concentration. Hence, in this case, the effect of suppressing gas generation in the negative electrode improves.

FIG. 2 is a view showing an example of a secondary battery in which both the first aqueous electrolyte 11 and the second aqueous electrolyte 12 are gel aqueous electrolytes. If both the first aqueous electrolyte 11 and the second aqueous electrolyte 12 are gel aqueous electrolytes, the first aqueous electrolyte 11 and the second aqueous electrolyte 12 do not mix. Hence, in this case as well, gas generation in the positive electrode and the negative electrode can be suppressed.

FIG. 3 is a view showing an example of a secondary battery in which both the first aqueous electrolyte 11 and the second aqueous electrolyte 12 are liquid aqueous electrolytes. As described above, even if both the first aqueous electrolyte 11 and the second aqueous electrolyte 12 are liquid, the two type of liquids can be separated using a specific lithium salt in each of the first aqueous electrolyte 11 and the second aqueous electrolyte 12. In this case, however, the interface between the first aqueous electrolyte 11 and the second aqueous electrolyte 12 is orthogonal to the gravity direction.

Figure 4:
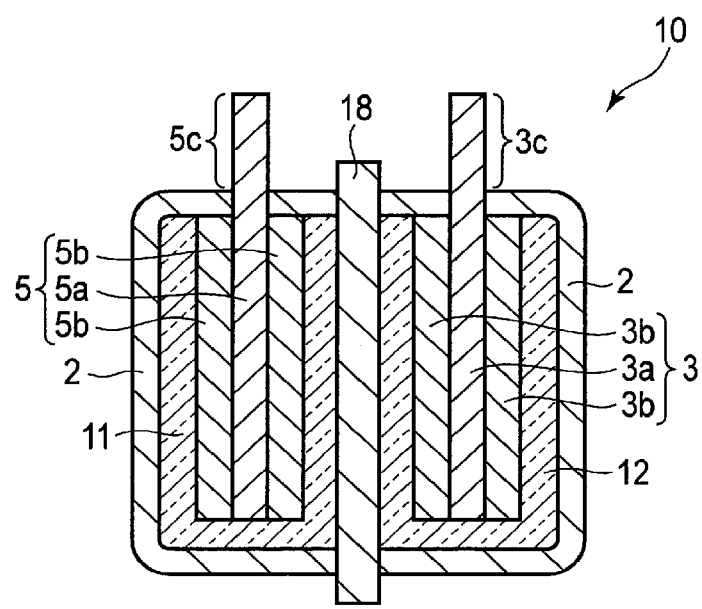
FIG. 4 is a sectional view schematically showing still another example of the secondary battery according to the first embodiment.

A case in which the secondary battery according to the embodiment includes a partition will be described next with reference to FIG. 4.

The secondary battery 10 shown in FIG. 4 includes a partition 18 in addition to the components of the secondary battery 10 described with reference to FIGS. 1, 2, and 3. The partition 18 separates the positive electrode 5 and the first aqueous electrolyte 11 from the negative electrode 3 and the second aqueous electrolyte 12. The partition 18 may extend from the inside to the outside of the container member 2, as shown in FIG. 4, or may be provided inside the container member 2. The material of the partition 18 is, for example, the above-described material.

FIG. 5 shows still another example of the secondary battery according to the embodiment.

The secondary battery 10 shown in FIG. 5 includes the negative electrode 3 including the negative electrode current collector 3a and the negative electrode active material layer 3b, the positive electrode 5 including the positive electrode current collector 5a and the positive electrode active material layer 5b, the first aqueous electrolyte 11 that is in contact with the positive electrode, the second aqueous electrolyte 12 that is in contact with the negative electrode, a salt bridge 19, and container members 2a and 2b. The negative electrode active material layer 3b is provided on part of both surfaces of the negative electrode current collector 3a. The positive electrode active material layer 5b is provided on part of both surfaces of the positive electrode current collector 5a. A portion of the negative electrode current collector 3a where the negative electrode active material layer 3b is not provided functions as the negative electrode tab 3c. A portion of the positive electrode current collector 5a where the positive electrode active material layer 5b is not provided functions as the positive electrode tab 5c.

The positive electrode 5 and the first aqueous electrolyte 11 are stored in the container member 2a in a state in which the positive electrode tab 5c projects outward. The negative electrode 3 and the second aqueous electrolyte 12 are stored in the container member 2b in a state in which the negative electrode tab 3c projects outward. The salt bridge 19 is configured to form a liquid junction between the first aqueous electrolyte 11 and the second aqueous electrolyte 12. A part of the salt bridge 19 is in contact with the first aqueous electrolyte 11, and another part of the salt bridge 19 is in contact with the second aqueous electrolyte 12.

In FIG. 5, the salt bridge 19 has an U-shaped structure. However, the shape of the salt bridge 19 is not particularly limited. A portion where the salt bridge 19 is in contact with the aqueous electrolyte may be provided with a porous diaphragm or not. Examples of the porous diaphragm include polyethylene (PE), polypropylene (PP), aramid, polyester, polysulphone, cellulose, and tetrafluoroethylene.

The salt bridge 19 can be produced, for example, as follows.

First, about 1% of agar is dissolved in a heated aqueous lithium acetate solution to prepare a solution. The solution is then put into a vinyl tube with a diameter of about 3 mm. After that, the vinyl tube is cooled to solidify the solution, thereby obtaining a salt bridge.

In the secondary battery including the salt bridge, even if the first aqueous electrolyte and the second aqueous electrolyte have the same composition, the two electrolytes can easily be separated. For example, even if both the first aqueous electrolyte and the second aqueous electrolyte are liquid aqueous electrolytes, and both the first aqueous electrolyte and the second aqueous electrolyte contain the same lithium salt, the two electrolytes can easily be separated.

Still another example of the secondary battery according to this embodiment will be described next with reference to FIGS. 6 and 7.

FIG. 6 is a schematic sectional view showing an example of the secondary battery according to the embodiment. FIG. 7 is an enlarged sectional view of a portion A in FIG. 6.

The secondary battery 10 shown in FIGS. 6 and 7 includes a flat wound electrode group 1.

As shown in FIG. 7, the wound electrode group 1 includes the negative electrode 3, a separator 4, the positive electrode 5, and the first aqueous electrolyte 11 in a gel state. The first aqueous electrolyte 11 in a gel state is provided on both surfaces of the positive electrode 5. The separator 4 intervenes between the first aqueous electrolyte 11 and the negative electrode 3. A stacked structure is formed by stacking the negative electrode 3, the separator 4, and the positive electrode 5 with the first aqueous electrolyte 11 provided on both surfaces. The stacked structure is spirally wound with the negative electrode 3 facing outward, as shown in FIG. 7, and pressed, thereby forming the wound electrode group 1.

The negative electrode 3 includes the negative electrode current collector 3a and the negative electrode active material layer 3b. The outermost negative electrode 3 has a structure in which the negative electrode active material layer 3b is formed only on one inner-side surface of the negative electrode current collector 3a, as shown in FIG. 7. In each of the remaining negative electrodes 3, the negative electrode active material layer 3b is formed on both surfaces of the negative electrode current collector 3a.

In the positive electrode 5, the positive electrode active material layer 5b is formed on both surfaces of the positive electrode current collector 5a. The first aqueous electrolyte 11 in a gel state is stacked on the positive electrode active material layers 5b formed on both surfaces of the positive electrode current collector 5a.

As shown in FIGS. 6 and 7, near the outer end of the wound electrode group 1, a negative electrode terminal 6 is connected to the negative electrode current collector 3a of the outermost negative electrode 3, and a positive electrode terminal 7 is connected to the positive electrode current collector 5a of the positive electrode 5 on the inner side.

The wound electrode group 1 is stored in the container member (sack-shaped container) 2 made of a laminated film with a metal layer intervening between two resin layers.

The negative electrode terminal 6 and the positive electrode terminal 7 extend outward from opening portions of the sack-shaped container 2. For example, the second aqueous electrolyte (not shown) in a liquid state is poured from the opening portion of the sack-shaped container 2 and stored in the sack-shaped container 2.

The opening portion of the sack-shaped container 2 is heat-sealed while sandwiching the negative electrode terminal 6 and the positive electrode terminal 7, thereby completely sealing the wound electrode group 1 and the second aqueous electrolyte. In the secondary battery 10 shown in FIGS. 6 and 7, the positive electrode 5 is in contact with the first aqueous electrolyte, and the negative electrode 3 is in contact with the second aqueous electrolyte.

The secondary battery according to the embodiment may form a battery module.

Examples of the battery module are a battery module including, as constituent units, plural of single batteries electrically connected in series, in parallel, or in a combination of series connection and parallel connection, a battery module including a unit formed from plural of single batteries electrically connected in series or a unit formed from plural of single batteries electrically connected in parallel, and a unit formed from plural of single batteries electrically connected in a combination of series connection and parallel connection.

The battery module may be stored in a case. As the case, a metal can made of an aluminum alloy, iron, stainless steel, or the like or a plastic container can be used. The wall thickness of the container is preferably 0.5 mm or more.

Examples of the form in which plural of secondary batteries are electrically connected in series or in parallel include a form in which plural of secondary batteries each including a container are electrically connected in series or in parallel and a form in which plural of electrode groups stored in a common case are electrically connected in series or in parallel. As a detailed example of the former, the positive electrode terminals and the negative electrode terminals of plural of secondary batteries are connected by bus bars made of a metal (for example, aluminum, nickel, or copper). As a detailed example of the latter, plural of electrode groups are stored in one case in a state in which they are electrochemically insulated by partitions, and the electrode groups are electrically connected in series. When five to seven batteries are electrically connected in series, for example, a battery module having satisfactory voltage compatibility with a lead storage battery can be obtained. To further improve the voltage compatibility with a lead storage battery, a structure including five or six single batteries connected in series is preferable.

An example of a battery module will be described with reference to FIG. 8.

FIG. 8 is a perspective view schematically showing an example of a battery module including, as single batteries, plural of secondary batteries according to the embodiment. A battery module 14 includes, for example, plural of secondary batteries $15_1$ to $15_5$ described with reference to FIGS. 6 and 7. A positive electrode lead 8 of the battery $15_1$ and a negative electrode lead 9 of the battery $15_2$ located adjacent to the battery $15_1$ are electrically connected by a lead 16. In addition, the positive electrode lead 8 of the battery $15_2$ and the negative electrode lead 9 of the battery $15_3$ located adjacent to the battery $15_2$ are electrically connected by the lead 16. The batteries $15_1$ to $15_5$ are thus electrically connected in series.

Note that if five secondary batteries according to the embodiment are connected in series, satisfactory compatibility with a lead storage battery can be obtained. For this reason, the battery module including five secondary batteries connected in series can be used as a power supply alternative to a lead storage battery.

According to the secondary battery of the first embodiment, the aqueous electrolyte includes the first aqueous electrolyte and a second aqueous electrolyte. The first aqueous electrolyte is in contact with the positive electrode and contains lithium ions. The second aqueous electrolyte is in contact with the negative electrode and contains lithium ions. The concentration of lithium ions contained in the second aqueous electrolyte is higher than the concentration of lithium ions contained in the first aqueous electrolyte. It is therefore possible to suppress gas generation in the positive electrode and the negative electrode. As a result, a secondary battery with an excellent charge-and-discharge efficiency and a long life can be obtained.

Second Embodiment

According to the second embodiment, a battery pack is provided. The battery pack includes the secondary battery according to the first embodiment.

The battery pack according to this embodiment may include one secondary battery or plural of secondary batteries. The plural of secondary batteries that can be included in the battery pack can be electrically connected in series, in parallel, or in a combination of series connection and parallel connection. The plural of secondary batteries may be electrically connected to form a battery module. The battery pack may include plural of battery modules.

The battery pack can further include a protective circuit. The protective circuit controls charge and discharge of the secondary battery. In addition, a circuit included in a device (for example, an electronic device or an automobile) that configured to use the battery pack as a power supply can be used as the protective circuit of the battery pack.

The battery pack can further include an external power distribution terminal. The external power distribution terminal is configured to output a current from the secondary battery to the outside and input a current to the secondary battery. In other words, when the battery pack is used as a power supply, a current is supplied to the outside via the external power distribution terminal. Additionally, when charging the battery pack, a charge current (including regenerative energy of an automobile) is supplied to the battery pack via the external power distribution terminal.

Next, an example of a battery pack according to the present embodiment will be described with reference to the drawings.

Figure 9:
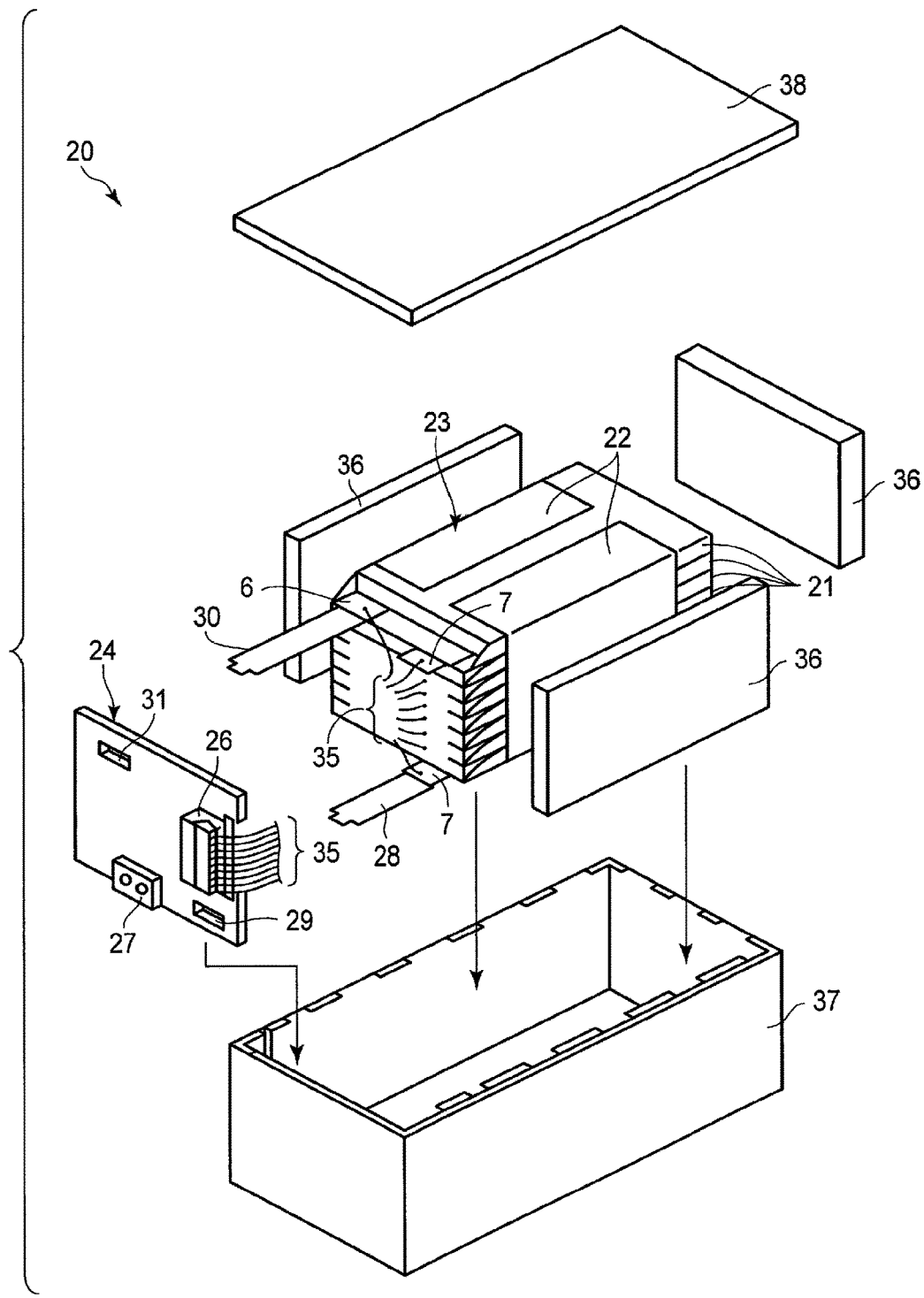
FIG. 9 is a perspective view schematically showing an example of a battery pack according to the second embodiment.
Figure 10:
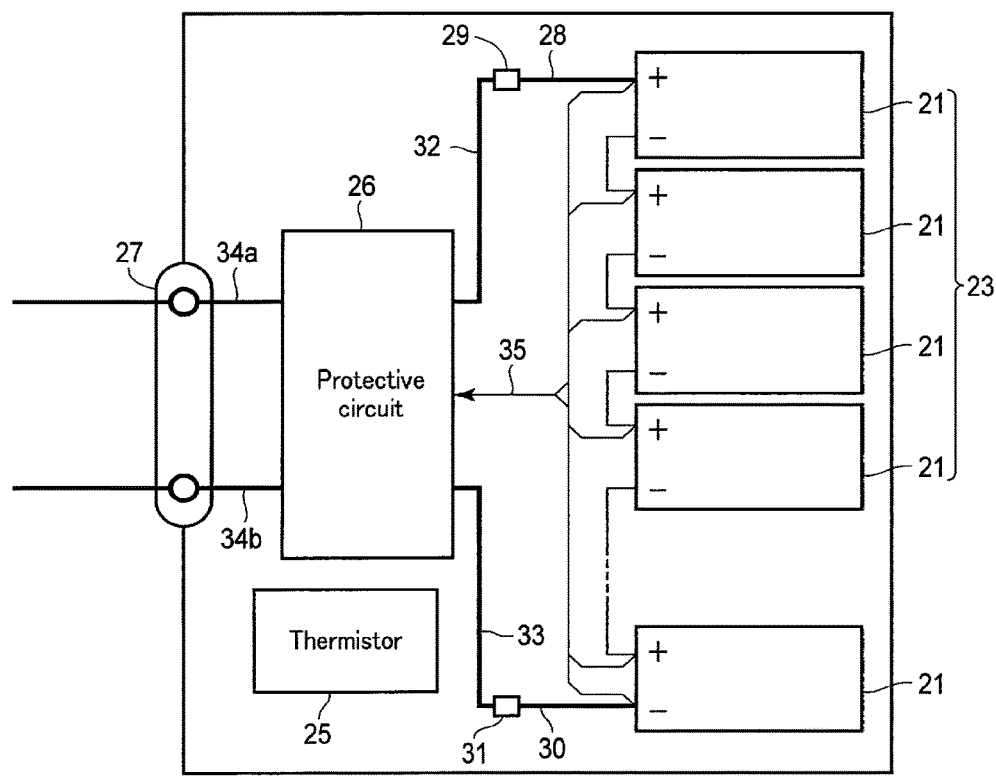
FIG. 10 is a block diagram showing the electric circuit of the battery pack shown in FIG. 9.

FIG. 9 is an exploded perspective view showing an example of the battery pack according to the present embodiment. FIG. 10 is a block diagram showing an electric circuit of the battery pack shown in FIG. 9.

A battery pack 20 shown in FIGS. 9 and 10 includes plural of flat-type single batteries 21 having a structure shown in FIGS. 6 and 7.

The plural of single batteries 21 compose a battery module 23, wherein the negative electrode terminals 6 and positive electrode terminals 7 extending out are laminated in the same direction, and bound together by an adhesive tape 22, thereby constituting a battery module 23. These single batteries 21 are electrically connected to each other in series, as shown in FIG. 10.

A printed wiring board 24 is opposed to side surfaces of the plurality of single batteries 21 from which the negative electrode terminal 6 and positive electrode terminal 7 are extended. On the printed wiring board 24, as shown in FIG. 10, a thermistor 25, a protective circuit 26, and an energizing terminal 27 for the external device are mounted. An insulating plate (not shown) is mounted on the printed wiring board 24 on the side opposed to the battery module 23, so as to avoid unnecessary connection to the wiring of the battery module 23.

A positive electrode lead 28 is connected to the positive electrode terminal 7 of the single battery 21 located in the lowest layer of the battery module 23, and the tip is inserted into and electrically connected to a positive electrode connector 29 on the printed wiring board 24. A negative electrode lead 30 is connected to the negative electrode terminal 6 of the single battery 21 located in the uppermost layer of the battery module 23, and the tip is inserted into and electrically connected to the negative electrode connector 31 on the printed wiring board 24. These connectors 29 and 31 are connected to the protective circuit 26 through the wirings 32 and 33 formed on the printed wiring board 24.

The thermistor 25 detects the temperature of each of the single batteries 21, and the detection signal is sent to the protective circuit 26. The protective circuit 26 can break the positive side wiring 34a and the negative side wiring 34b between the protective circuit 26 and the energizing terminal 27 for the external device under a predetermined condition. Examples of the predetermined condition include the case where a signal showing that the temperature of the single battery 21 is not less than a predetermined temperature is received from the thermistor 25. Another example of the predetermined condition is the case of detecting over-charge, over-discharge, over-current and the like of the single battery 21. The detection of the over-charge and the like is performed for each of the respective single batteries 21 or the battery module 23. When each of the single batteries 21 is detected, the battery voltage may be detected, or the positive or negative electrode potential may be detected. In the latter case, a lithium electrode used as a reference electrode is inserted into each of the single batteries 21. In the case of the battery pack shown in FIGS. 9 and 10, wiring 35 for voltage detection is connected to each of the single batteries 21, and the detection signal is sent to the protective circuit 26 through the wiring 35.

Among the four side surfaces of the battery module 23, a protective sheet 36 made of rubber or resin is placed on each of the three side surfaces of the battery module 23 excluding the side surface from which the positive electrode terminal 7 and negative electrode terminal 6 are protruded.

The battery module 23 is accommodated in an accommodating container 37 together with the protective sheet 36 and the printed wiring board 24. The protective sheet 36 is disposed on each inside surface in the direction of the long side and on one of the inside surfaces in the direction of the short side of the accommodating container 37. The printed wiring board 24 is disposed on an opposite inside surface opposed to the inside surface in the direction of the short side of the accommodating container 37 on which the protective sheet 36 is disposed. The battery module 23 is located in the space surrounded by the protective sheets 36 and the printed wiring board 24. A lid 38 is mounted on the top surface of the accommodating container 37.

It is to be noted that for fixing the battery module 23, a heat-shrinkable tape may be used in place of an adhesive tape 22. In this case, a protective sheet is disposed on both side surfaces of the battery module 23, the heat-shrinkable tape is wrapped, and the heat-shrinkable tape is then shrunk by heat to bind the battery module.

The battery pack 20 shown in FIGS. 9 and 10 has a form in which plural of single batteries 21 are connected in series, but the battery pack 20 may include plural of single batteries 21 connected in parallel in order to increase the battery capacity. Alternatively, the battery pack 20 may include plural of single batteries 21 connected by combining series connection and parallel connection. The battery packs 20 may be further electrically connected in series or in parallel.

Although the battery pack 20 shown in FIGS. 9 and 10 includes the plurality of single batteries 21, the battery pack 20 may include a single battery 21.

The form of the battery pack is appropriately changed in accordance with the application purpose. The battery pack according to this embodiment is suitably used for an application purpose requiring an excellent life characteristic when a large current is extracted. More specifically, the battery pack is used as, for example, a power supply for a digital camera, an onboard battery for vehicles such as a two- or four-wheeled hybrid electronic automobile, a two- or four-wheeled electronic automobile, and an electric bicycle, a stationary battery, or a battery for a rail way car. In particular, the battery pack is suitably used as an onboard battery.

In a vehicle such as an automobile in which the battery pack according to this embodiment is mounted, the battery pack is configured to, for example, collect a regenerative energy of the motive force of the vehicle.

The battery pack according to the second embodiment includes the secondary battery according to the first embodiment. For this reason, the battery pack can achieve an excellent charge-and-discharge efficiency and life characteristic. Additionally, according to the second embodiment, it is possible to provide a battery pack suitable as a power supply alternative to a lead storage battery that is used as a starter power supply for a vehicle, or as an onboard secondary battery mounted in a hybrid car.

Third Embodiment

According to the third embodiment, a vehicle is provided. The vehicle includes the battery pack according to the second embodiment.

Figure 11:
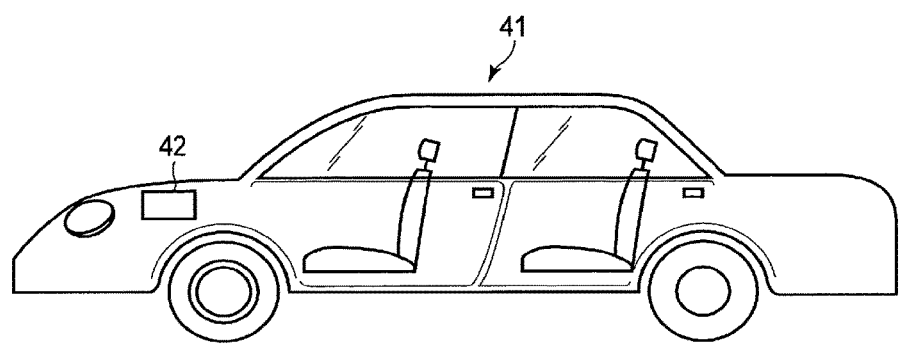
FIG. 11 is a sectional view schematically showing an example of a vehicle according to the third embodiment.

FIG. 11 shows an example of a vehicle including the battery pack according to the second embodiment.

An automobile 41 shown in FIG. 11 includes a battery pack 42 mounted in an engine room on the front side of the vehicle body. The mount position of the battery pack in the automobile is not limited to the engine room. For example, the battery pack may be mounted on the rear side or under a seat of the automobile.

The arrangement of a mode of a vehicle including a secondary battery according to the embodiment will be described below with reference to FIG. 12.

Figure 12:
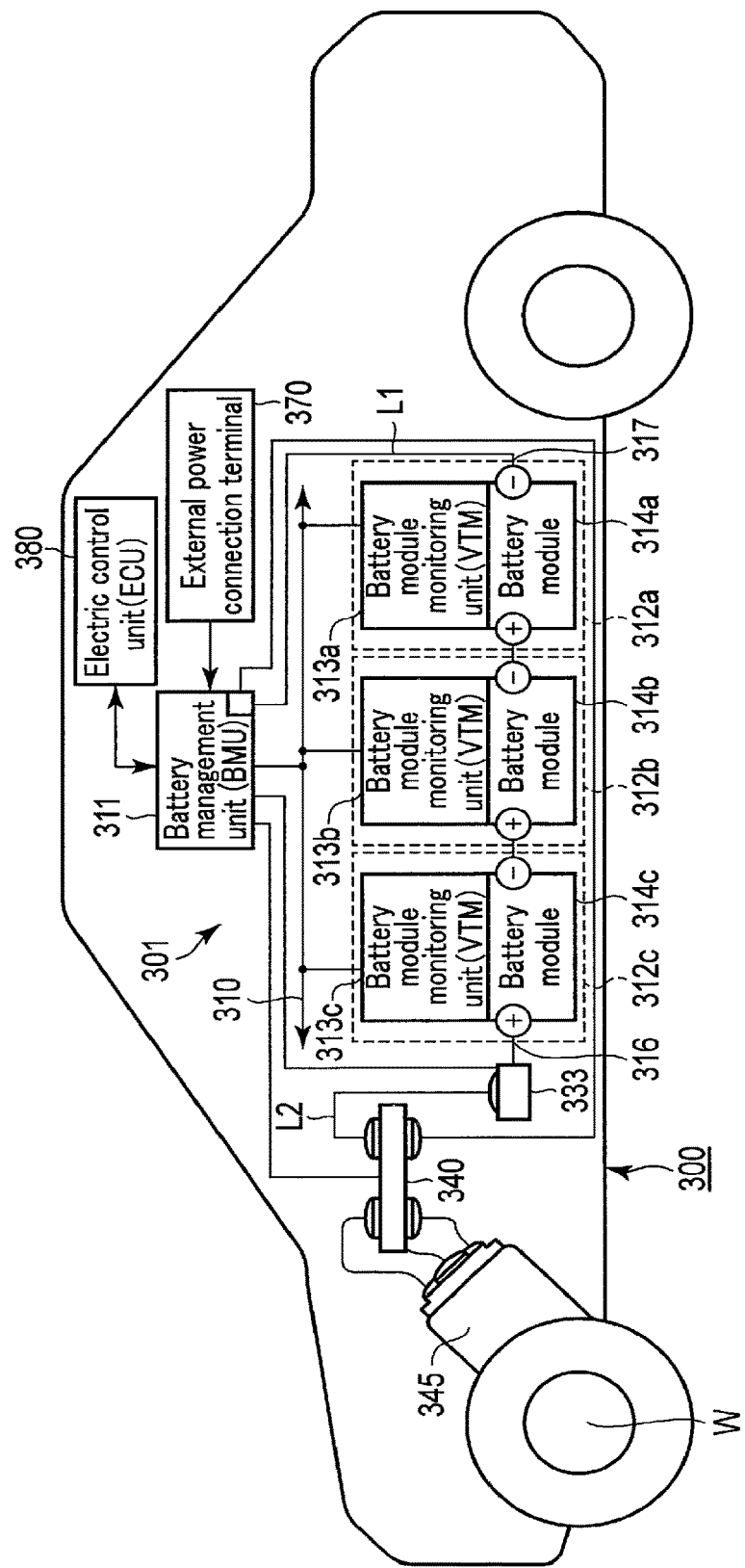
FIG. 12 is a schematic view showing a detailed mode of a vehicle in which the secondary battery according to the first embodiment is mounted.

FIG. 12 is a view schematically showing the arrangement of a mode of a vehicle in which the secondary battery according to the embodiment is mounted. A vehicle 300 shown in FIG. 12 is an electric automobile.

The vehicle 300 shown in FIG. 12 includes a vehicle power supply 301, a vehicle ECU (Electric Control Unit) 380 serving as the host control means of the vehicle power supply 301, an external terminal (a terminal used to connect an external power supply) 370, an inverter 340, and a drive motor 345.

In the vehicle 300, the vehicle power supply 301 is mounted, for example, in an engine room, on the rear side of the vehicle body of the automobile, or under a seat. However, FIG. 12 schematically shows the mount position of the secondary battery in the vehicle 300.

The vehicle power supply 301 includes plural of (for example, three) battery packs 312a, 312b, and 312c, a BMU (Battery Management Unit) 311, and a communication bus 310.

The three battery packs 312a, 312b, and 312c are electrically connected in series. The battery pack 312a includes a battery module 314a and a battery module monitoring unit (For example, VTM: Voltage Temperature Monitoring) 313a. The battery pack 312b includes a battery module 314b and a battery module monitoring unit 313b. The battery pack 312c includes a battery module 314c and a battery module monitoring unit 313c. The battery packs 312a, 312b, and 312c can independently be detached and exchanged with another battery pack.

Each of the battery modules 314a to 314c includes plural of secondary batteries connected in series. Each secondary battery is, for example, the secondary battery according to the first embodiment. Each of the battery modules 314a to 314c performs charge and discharge via a positive electrode terminal 316 and a negative electrode terminal 317.

To collect information about the maintenance of the vehicle power supply 301, the BMU 311 communicates with the battery module monitoring units 313a to 313c and collects information of the voltages and temperatures of the secondary batteries of the battery modules 314a to 314c included in the vehicle power supply 301.

The communication bus 310 is connected between the BMU 311 and the battery module monitoring units 313a to 313c. The communication bus 310 is configured to cause plural of nodes (the BMU and at least one battery module monitoring unit) to share a set of communication lines. The communication bus 310 is a communication bus configured based on, for example, the CAN (Control Area Network) standard.

The battery module monitoring units 313a to 313c measure the voltage and temperature of the individual secondary batteries of the battery modules 314a to 314c based on a command from the BMU 311 by communication. The temperature can be measured at several points per battery module, and it is unnecessary to measure the temperatures of all secondary batteries.

The vehicle power supply 301 can also include an electromagnetic contactor (for example, a switch device 333 shown in FIG. 12) configured to connect/disconnect the positive electrode terminal and the negative electrode terminal. The switch device 333 includes a precharge switch (not shown) to be turned on when charging the battery modules 314a to 314c, and a main switch (not shown) to be turned on when supplying a battery output to a load. Each of the precharge switch and the main switch includes a relay circuit (not shown) that is turned on/off by a signal supplied to a coil arranged near the switch element.

The inverter 340 converts an input DC voltage into a three-phase AC high voltage to drive a motor. The output voltage of the inverter 340 is controlled based on a control signal from the BMU 311 (to be described later) or the vehicle ECU 380 configured to control the entire operation of the vehicle. The three-phase output terminals of the inverter 340 are connected to the three-phase input terminals of the drive motor 345.

The drive motor 345 is rotated by power supplied from the inverter 340 and transmits the rotation to the axle shafts and driving wheels W via, for example, a differential gear unit.

Although not illustrated, the vehicle 300 includes a regeneration brake mechanism that rotates the drive motor 345 when braking the vehicle 300 and converts the kinetic energy into regenerative energy as electric energy. The regenerative energy recovered by the regeneration brake mechanism is input to the inverter 340 and converted into a DC current. The DC current is input to the vehicle power supply 301.

One terminal of a connection line Li is connected to the negative electrode terminal 317 of the vehicle power supply 301. The connection line L1 is connected to the negative electrode input terminal of the inverter 340 via a current detection unit (not shown) in the BMU 311.

One terminal of a connection line L2 is connected to the positive electrode terminal 316 of the vehicle power supply 301 via the switch device 333. The other terminal of the connection line L2 is connected to the positive electrode input terminal of the inverter 340.

The external terminal 370 is connected to the BMU 311. The external terminal 370 can be connected to, for example, an external power supply.

The vehicle ECU 380 manages the whole vehicle by controlling the BMU 311 in cooperation with other devices in response to an operation input of the driver or the like. Data concerning the maintenance of the vehicle power supply 301 such as the remaining capacity of the vehicle power supply 301 is transferred between the BMU 311 and the vehicle ECU 380 via a communication line.

In the vehicle including the secondary battery according to the embodiment, each of the battery packs 312a, 312b, and 312c can achieve an excellent charge-and-discharge efficiency and life characteristic. Hence, according to the embodiment, it is possible to provide a vehicle in which a battery pack capable of achieving an excellent charge-and-discharge efficiency and life characteristic is mounted.

EXAMPLES

Examples will be described blow. The embodiments are not limited to the examples to be described below.

Example 1

<Production of Positive Electrode>

A positive electrode was produced in the following way. Lithium manganese oxide ($LiMn_2O_4$) having a spinel structure and an average particle size of 10 μm was prepared as a positive electrode active material, graphite powder was prepared as a conductive agent, and polyvinylidene fluoride (PVdF) was prepared as a binder. The positive electrode active material, the conductive agent, and the binder were combined at ratios of 80 wt %, 10 wt %, and 10 wt %, respectively, with respect to the weight of the positive electrode and dispersed in an N-methyl-2-pyrrolidone (NMP) solvent to prepare a slurry. The prepared slurry was applied to both surfaces of a Ti foil serving as a positive electrode current collector and having a thickness of 12 μm, and the coating was dried to form a positive electrode active material layer. A step of pressing the positive electrode current collector and the positive electrode active material layer on it was performed, thereby producing a positive electrode having an electrode density of 3.0 g/cm³.

<Production of Negative Electrode>

A negative electrode was produced in the following way. $Li_4Ti_5O_{12}$ powder having an average particle size (diameter) of 15 μm was prepared as a negative electrode active material, graphite powder was prepared as a conductive agent, and PVdF was prepared as a binder. The negative electrode active material, the conductive agent, and the binder were combined at ratios of 80 wt %, 10 wt %, and 10 wt %, respectively, with respect to the weight of the negative electrode and dispersed in an NMP solvent to prepare a slurry. The obtained slurry was applied to a Zn foil serving as a negative electrode current collector and having a thickness of 20 μm, and the coating was dried to form a negative electrode active material layer. Here, when applying the slurry to the Zn foil, the slurry was applied only to one surface of the Zn foil for a portion located at the outermost portion of the electrode group of the negative electrodes to be produced, and the slurry was applied to both surfaces of the Zn foil for the remaining portions. A step of pressing the negative electrode current collector and the negative electrode active material layer on it was performed, thereby producing a negative electrode having an electrode density of 2.0 g/cm³.

<Preparation of Aqueous Electrolyte and Production of Electrode Group>

An aqueous electrolyte with 5 M of LiTFSI dissolved in 1 L of water was prepared as a first aqueous electrolyte. An aqueous electrolyte with 9 M of LiCl dissolved in 1 L of water was prepared as a second aqueous electrolyte. Polyacrylonitrile (PAN) was mixed with the first aqueous electrolyte at a ratio of 4 wt % with respect to the first aqueous electrolyte, thereby producing the first aqueous electrolyte in a gel state. The thus produced first aqueous electrolyte in the gel state was applied to both surfaces of the positive electrode. More specifically, the positive electrode was immersed in the first aqueous electrolyte in the gel state so that the positive electrode active material layer of the positive electrode was immersed, and after that, the positive electrode was dried.

The positive electrode with first aqueous electrolyte stacked on both surfaces, a nonwoven fabric separator made of cellulose fiber and having a thickness of 20 μm, the negative electrode, and another nonwoven fabric separator were stacked in this order to obtain a stacked body. Next, the stacked body was spirally wound such that the negative electrode was located at the outermost position, thereby producing an electrode group. The electrode group was hot-pressed at 90° C., thereby producing a flat electrode group. The obtained electrode group was stored in a thin metal can made of stainless steel with a thickness of 0.25 mm. Note that a valve configured to leak a gas when the internal pressure is 2 atmospheric pressures or more is placed on the metal can. The second aqueous electrolyte was poured into the metal can, thereby producing a secondary battery. The produced secondary battery had the arrangement described with reference to FIG. 1 (or FIG. 6).

<First Charge and Discharge>

After the electrolyte was poured, the secondary battery was left stand for 24 hours under a 25° C. environment. Then, the battery was submitted to first charge and discharge under the 25° C. environment. In the first charge and discharge, the battery was first charged up to 2.8 V by 1 A and then discharged up to 2.0 V by 1 A, and the capacity of the battery was confirmed.

<Cycle Test>

A series of operations of charging the battery up to 2.8 V by a constant current of 1 A, providing a quiescent time of 10 min, discharging the battery up to 2.0 V by a constant current of 1 A, and providing a quiescent time of 10 min again under the 25° C. environment was be defined as one charge-and-discharge cycle, and the charge-and-discharge cycle was repeated 50 times for the produced secondary battery. Results obtained by calculating the capacity in the 50th cycle with respect to the initial capacity and the charge-and-discharge efficiency (discharge capacity/charge capacity) in the 50th cycle are shown in Table 1 later.

In Table 1, the column of "positive electrode active material" represents a positive electrode active material used in each example. The column of "negative electrode active material" represents a negative electrode active material used in each example. The column of "type and concentration of lithium salt" represents the type and concentration (M) of lithium salt used when preparing the aqueous electrolyte. Note that the unit M represents mol/L. The concentration (M) of lithium salt represents not an amount of substance (mol) with respect to 1 L of solvent but an amount of substance (mol) with respect to 1 L of solution. The column of "polymeric material" represents a polymeric material contained in an aqueous electrolyte. In the column of "polymeric material", "-" means that no polymeric material is mixed with an electrolyte of interest. The column of "Partition" represents a type of partition used in each example. The column of "Capacity Retention Ratio (%)" represents, as a percentage, the capacity (capacity retention ratio) after 50 cycles with respect to the initial capacity. The column of "Charge-and-Discharge Efficiency (%)" represents, as a percentage, the discharge capacity with respect to the charge capacity in the 50th cycle. Table 1 also shows the results of examples 2 to 14 and comparative examples 1 to 5 to be described later.

Example 2

A secondary battery was produced in accordance with the same procedure as that described in Example 1 except that polyethylene oxide (PEO) was used in place of polyacrylonitrile (PAN), and submitted to a cycle test. The produced secondary battery had the arrangement described with reference to FIG. 1 (or FIG. 6).

Example 3

A secondary battery was produced in accordance with the same procedure as that described in Example 1 except that an aqueous electrolyte prepared by dissolving 1 M of LiTFSI in 1 L of water was used as a first aqueous electrolyte, and an aqueous electrolyte prepared by dissolving 3 M of LiCl and 0.25 M of $Li_2SO_4$ in 1 L of water was used as a second aqueous electrolyte, and submitted to a cycle test. The produced secondary battery had the arrangement described with reference to FIG. 1 (or FIG. 6).

Example 4

A secondary battery was produced in accordance with the same procedure as that described in Example 1 except that an aqueous electrolyte prepared by dissolving 1 M of LiFSI in 1 L of water was used as a first aqueous electrolyte, and an aqueous electrolyte prepared by dissolving 3 M of LiCl and 0.25 M of $Li_2SO_4$ in 1 L of water was used as a second aqueous electrolyte, and submitted to a cycle test. The produced secondary battery had the arrangement described with reference to FIG. 1 (or FIG. 6).

Example 5

A secondary battery was produced in accordance with the same procedure as that described in Example 1 except that no polymeric material was mixed with a first aqueous electrolyte, and polyacrylonitrile (PAN) was mixed with a second aqueous electrolyte to produce a second aqueous electrolyte in a gel state, and submitted to a cycle test. The produced secondary battery had the arrangement described with reference to FIG. 1.

Example 6

A positive electrode, a negative electrode, a first aqueous electrolyte, and a second aqueous electrolyte were produced in accordance with the same procedure as that described in Example 1. Polyacrylonitrile (PAN) was mixed with both the first aqueous electrolyte and the second aqueous electrolyte, thereby producing a first aqueous electrolyte in a gel state and a second aqueous electrolyte in a gel state.

A secondary battery was produced in accordance with the same procedure as that described in Example 1 except that the first aqueous electrolyte in the gel state and the second aqueous electrolyte in the gel state were applied to the positive electrode and the negative electrode, respectively, to produce an electrode group, and submitted to a cycle test. The produced secondary battery had the arrangement described with reference to FIG. 2.

Example 7

A secondary battery was produced in accordance with the same procedure as that described in Example 1 except that an aqueous electrolyte prepared by dissolving 3 M of LiCl in 1 L of water was used as a first aqueous electrolyte, and submitted to a cycle test. The produced secondary battery had the arrangement described with reference to FIG. 1 (or FIG. 6).

Example 8

The positive electrode produced in Example 1, $Li_7La_3Zr_2O_{12}$ (LLZ) having a thickness of 200 μm and serving as a partition, and the negative electrode produced in Example 1 were stacked in this order to obtain a stacked body. A secondary battery was produced in accordance with the same procedure as that described in Example 1 except that an aqueous electrolyte prepared by dissolving 3 M of LiCl in 1 L of water was used as a first aqueous electrolyte and the stacked body was used, and submitted to a cycle test. The produced secondary battery had the arrangement described with reference to FIG. 4.

Example 9

A secondary battery was produced in accordance with the same procedure as that described in Example 1 except that an aqueous electrolyte prepared by dissolving 3 M of LiCl in 1 L of water was used as a first aqueous electrolyte, and an aqueous electrolyte prepared by dissolving 5 M of LiTFSI in 1 L of water was used as a second aqueous electrolyte, and submitted to a cycle test.

The produced secondary battery had the arrangement described with reference to FIG. 1 (or FIG. 6).

Example 10

A secondary battery was produced in accordance with the same procedure as that described in Example 1 except that an aqueous electrolyte prepared by dissolving 3 M of LiCl in 1 L of water was used as a first aqueous electrolyte, and an aqueous electrolyte prepared by dissolving 5 M of LiFSI in 1 L of water was used as a second aqueous electrolyte, and submitted to a cycle test. The produced secondary battery had the arrangement described with reference to FIG. 1 (or FIG. 6).

Example 11

The positive electrode produced in Example 1, $Li_7La_3Zr_2O_{12}$ (LLZ) having a thickness of 200 μm and serving as a partition, and the negative electrode produced in Example 1 were stacked in this order to obtain a stacked body. A secondary battery was produced in accordance with the same procedure as that described in Example 1 except that an aqueous electrolyte prepared by dissolving 1 M of $Li_2SO_4$ in 1 L of water was used as a first aqueous electrolyte and the stacked body was used, and submitted to a cycle test. The produced secondary battery had the arrangement described with reference to FIG. 4.

Example 12

A secondary battery was produced in accordance with the same procedure as that described in Example 1 except that an aqueous electrolyte prepared by dissolving 1 M of $LiCH_3COO$ in 1 L of water was used as a first aqueous electrolyte, and an aqueous electrolyte prepared by dissolving 5 M of LiTFSI in 1 L of water was used as a second aqueous electrolyte, and submitted to a cycle test. The produced secondary battery had the arrangement described with reference to FIG. 1 (or FIG. 6).

Example 13

A secondary battery was produced in accordance with the same procedure as that described in Example 1 except that lithium cobaltite (LiCoO$_2$) was used as a positive electrode active material, and submitted to a cycle test. The produced secondary battery had the arrangement described with reference to FIG. 1 (or FIG. 6).

Example 14

A secondary battery was produced in accordance with the same procedure as that described in Example 1 except that titanium oxide (TiO$_2$) was used as a negative electrode active material, and submitted to a cycle test. The produced secondary battery had the arrangement described with reference to FIG. 1 (or FIG. 6).

Comparative Example 1

A secondary battery was produced in accordance with the same procedure as that described in Example 1 except that an aqueous electrolyte prepared by dissolving 9 M of LiCl in 1 L of water was used as a first aqueous electrolyte, and submitted to a cycle test. The produced secondary battery had the arrangement described with reference to FIG. 1 (or FIG. 6).

Comparative Example 2

A secondary battery was produced in accordance with the same procedure as that described in Example 1 except that an aqueous electrolyte prepared by dissolving 12 M of LiCl in 1 L of water was used as a first aqueous electrolyte, and an aqueous electrolyte prepared by dissolving 12 M of LiCl in 1 L of water was used as a second aqueous electrolyte, and submitted to a cycle test. The produced secondary battery had the arrangement described with reference to FIG. 1 (or FIG. 6).

Comparative Example 3

A secondary battery was produced in accordance with the same procedure as that described in Example 1 except that an aqueous electrolyte prepared by dissolving 4 M of LiCl in 1 L of water was used as a first aqueous electrolyte, and an aqueous electrolyte prepared by dissolving 4 M of LiCl in 1 L of water was used as a second aqueous electrolyte, and submitted to a cycle test. The produced secondary battery had the arrangement described with reference to FIG. 1 (or FIG. 6).

Comparative Example 4

A secondary battery was produced in accordance with the same procedure as that described in Example 1 except that an aqueous electrolyte prepared by dissolving 9 M of LiCl in 1 L of water was used as a first aqueous electrolyte, and an aqueous electrolyte prepared by dissolving 3 M of LiCl in 1 L of water was used as a second aqueous electrolyte, and submitted to a cycle test. The produced secondary battery had the arrangement described with reference to FIG. 1 (or FIG. 6).

Comparative Example 5

A secondary battery was produced in accordance with the same procedure as that described in Example 1 except that an aqueous electrolyte prepared by dissolving 5 M of LiCl in 1 L of water was used as a first aqueous electrolyte, and an aqueous electrolyte prepared by dissolving 0.1 M of LiTFSI in 1 L of water was used as a second aqueous electrolyte, and submitted to a cycle test. The produced secondary battery had the arrangement described with reference to FIG. 1 (or FIG. 6).

TABLE 1

| | Positive Electrode Active Material | Negative Electrode Active Material | First Aqueous Electrolyte (in Contact with Positive Electrode) | | Second Aqueous Electrolyte (in Contact with Negative Electrode) | | | Charge and | |
|---|---|---|---|---|---|---|---|---|---|
| | | | Type and Concentration of Lithium Salt (M) | Polymeric Material | Type and Concentration of Lithium Salt (M) | Polymeric Material | Partition | Capacity Retention Ratio (%) | Discharge Efficiency (%) |
| Example 1 | LiMn$_2$O$_4$ | Li$_4$Ti$_5$O$_{12}$ | LiTFSI 5M | PAN | LiCl 9M | — | Absent | 90 | 93 |
| Example 2 | LiMn$_2$O$_4$ | Li$_4$Ti$_5$O$_{12}$ | LiTFSI 5M | PEO | LiCl 9M | — | Absent | 92 | 92 |
| Example 3 | LiMn$_2$O$_4$ | Li$_4$Ti$_5$O$_{12}$ | LiTFSI 1M | PAN | LiCl 3M + Li$_2$SO$_4$ 0.25M | — | Absent | 98 | 94 |
| Example 4 | LiMn$_2$O$_4$ | Li$_4$Ti$_5$O$_{12}$ | LiFSI 1M | PAN | LiCl 3M + Li$_2$SO$_4$ 0.25M | — | Absent | 97 | 92 |
| Example 5 | LiMn$_2$O$_4$ | Li$_4$Ti$_5$O$_{12}$ | LiTFSI 5M | — | LiCl 9M | PAN | Absent | 95 | 91 |
| Example 6 | LiMn$_2$O$_4$ | Li$_4$Ti$_5$O$_{12}$ | LiTFSI 5M | PAN | LiCl 9M | PAN | Absent | 91 | 92 |
| Example 7 | LiMn$_2$O$_4$ | Li$_4$Ti$_5$O$_{12}$ | LiCl 3M | PAN | LiCl 9M | — | Absent | 95 | 82 |
| Example 8 | LiMn$_2$O$_4$ | Li$_4$Ti$_5$O$_{12}$ | LiCl 3M | — | LiCl 9M | — | LLZ | 92 | 80 |
| Example 9 | LiMn$_2$O$_4$ | Li$_4$Ti$_5$O$_{12}$ | LiCl 3M | PAN | LiTFSI 5M | — | Absent | 96 | 88 |
| Example 10 | LiMn$_2$O$_4$ | Li$_4$Ti$_5$O$_{12}$ | LiCl 3M | PAN | LiFSI 5M | — | Absent | 95 | 88 |
| Example 11 | LiMn$_2$O$_4$ | Li$_4$Ti$_5$O$_{12}$ | Li$_2$SO$_4$ 1M | — | LiCl 9M | — | LLZ | 93 | 80 |
| Example 12 | LiMn$_2$O$_4$ | Li$_4$Ti$_5$O$_{12}$ | LiCH$_3$COO 1M | PAN | LiTFSI 5M | — | Absent | 92 | 81 |
| Example 13 | LiCoO$_2$ | Li$_4$Ti$_5$O$_{12}$ | LiTFSI 5M | PAN | LiCl 9M | — | Absent | 93 | 89 |
| Example 14 | LiMn$_2$O$_4$ | TiO$_2$ | LiTFSI 5M | PAN | LiCl 9M | — | Absent | 95 | 90 |
| Comparative Example 1 | LiMn$_2$O$_4$ | Li$_4$Ti$_5$O$_{12}$ | LiCl 9M | PAN | LiCl 9M | — | Absent | 85 | 65 |
| Comparative Example 2 | LiMn$_2$O$_4$ | Li$_4$Ti$_5$O$_{12}$ | LiCl 12M | PAN | LiCl 12M | — | Absent | 89 | 72 |
| Comparative Example 3 | LiMn$_2$O$_4$ | Li$_4$Ti$_5$O$_{12}$ | LiCl 4M | PAN | LiCl 4M | — | Absent | 60 | 50 |
| Comparative Example 4 | LiMn$_2$O$_4$ | Li$_4$Ti$_5$O$_{12}$ | LiCl 9M | PAN | LiCl 3M | — | Absent | 55 | 45 |
| Comparative Example 5 | LiMn$_2$O$_4$ | Li$_4$Ti$_5$O$_{12}$ | LiCl 5M | PAN | LiTFSI 0.1M | — | Absent | 70 | 60 |

The followings can be seen from Table 1.

Examples 1 to 14 in which the lithium ion concentration of the second aqueous electrolyte was higher than the lithium ion concentration of the first aqueous electrolyte were excellent in both the capacity retention ratio and the charge-and-discharge efficiency as compared to Comparative Examples 1 to 5.

Examples 3 and 4 in which lithium chloride and lithium sulfate were used as the lithium salts of the second aqueous electrolyte were excellent in the capacity retention ratio as compared to Example 1 in which only lithium chloride was used. As is apparent from comparison between Example 1 and Example 2, even if the polymeric material is changed, an excellent capacity retention ratio and charge-and-discharge efficiency can be achieved. As can be seen from examples 1, 5, and 6, if at least one of the first aqueous electrolyte and the second aqueous electrolyte is a gel aqueous electrolyte, an excellent capacity retention ratio and charge-and-discharge efficiency can be achieved. Even if the same type of lithium salt is used, an excellent capacity retention ratio and charge-and-discharge efficiency can be achieved if the lithium ion concentration of the second aqueous electrolyte is higher than the lithium ion concentration of the first aqueous electrolyte, as is apparent from Example 7. As can be seen from Examples 8 and 11, even if both the first aqueous electrolyte and the second aqueous electrolyte are liquid aqueous electrolytes, an excellent capacity retention ratio and charge-and-discharge efficiency can be achieved by using a partition.

As shown in Comparative Examples 1 to 3, even if the first aqueous electrolyte is a gel aqueous electrolyte, an excellent capacity retention ratio and charge-and-discharge efficiency cannot be achieved if the first aqueous electrolyte and the second aqueous electrolyte have the same lithium ion concentration, as is apparent.

According to at least one of the embodiments and examples described above, since the aqueous electrolyte includes the first aqueous electrolyte that is in contact with the positive electrode and contains lithium ions and the second aqueous electrolyte that is in contact with the negative electrode and contains lithium ions, and the concentration of lithium ions contained in the second aqueous electrolyte is higher than the concentration of lithium ions contained in the first aqueous electrolyte, gas generation in the positive electrode and the negative electrode can be suppressed. As a result, a secondary battery with an excellent charge-and-discharge efficiency and a long life can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising a positive electrode, a negative electrode, and an aqueous electrolyte,
    wherein the aqueous electrolyte includes a first aqueous electrolyte and a second aqueous electrolyte,
    the first aqueous electrolyte contains lithium ions,
    the second aqueous electrolyte contains lithium ions,
    a concentration of the lithium ions contained in the second aqueous electrolyte is higher than the concentration of the lithium ions contained in the first aqueous electrolyte, and
    the first aqueous electrolyte is substantially in contact with only the positive electrode among the negative electrode and the positive electrode, and the second aqueous electrolyte is substantially in contact with only the negative electrode among the negative electrode and the positive electrode.

2. The secondary battery according to claim 1,
    wherein the first aqueous electrolyte is in contact with only the positive electrode among the negative electrode and the positive electrode, and the second aqueous electrolyte is in contact with only the negative electrode among the negative electrode and the positive electrode.

3. The secondary battery according to claim 1,
    wherein a concentration C1 of the lithium ions contained in the first aqueous electrolyte falls within a range from 1 mol/L to less than 5 mol/L, and
    a concentration C2 of the lithium ions contained in the second aqueous electrolyte falls within a range from 5 mol/L to 12 mol/L.

4. The secondary battery according to claim 3,
    wherein a ratio C2/C1 of the concentration C2 of the lithium ions contained in the second aqueous electrolyte to the concentration C1 of the lithium ions contained in the first aqueous electrolyte falls within a range from 2 to 11.

5. The secondary battery according to claim 1,
    wherein at least one of the first aqueous electrolyte and the second aqueous electrolyte is a gel aqueous electrolyte.

6. The secondary battery according to claim 1, further comprising a partition configured to separate the first aqueous electrolyte and the second aqueous electrolyte,
    wherein the partition is an ion exchange membrane or a solid electrolyte.

7. The secondary battery according to claim 1,
    wherein the first aqueous electrolyte contains a first anionic species, the second aqueous electrolyte contains a second anionic species, and
    the first anionic species and the second anionic species are different from each other.

8. The secondary battery according to claim 7,
    wherein the first anionic species includes sulfate ions, and
    the second anionic species includes at least one species selected from the group consisting of bis(trifluoromethanesulfonyl)imide ions and bis(fluorosulfonyl)imide ions.

9. A battery pack comprising the secondary battery according to claim 1.

10. The battery pack according to claim 9, further comprising an external power distribution terminal and a protective circuit.

11. The battery pack according to claim 9, further comprising plural of the secondary batteries,
    wherein the secondary batteries are electrically connected in series, in parallel, or in a combination of series connection and parallel connection.

12. A vehicle comprising the battery pack according to claim 9.

13. The vehicle according to claim 12, which comprises a mechanism configured to convert kinetic energy of the vehicle into regenerative energy.

14. The secondary battery according to claim 1, wherein a ratio C2/C1 of a concentration C2 of the lithium ions contained in the second aqueous electrolyte to a concentration C1 of the lithium ions contained in the first aqueous electrolyte is higher than 1.

15. A secondary battery comprising a positive electrode, a negative electrode, and an aqueous electrolyte,
wherein the aqueous electrolyte includes a first aqueous electrolyte and a second aqueous electrolyte,
the first aqueous electrolyte is in contact with at least part of the positive electrode and contains lithium ions,
the second aqueous electrolyte is in contact with at least part of the negative electrode and contains lithium ions, and
a concentration of the lithium ions contained in the second aqueous electrolyte is higher than the concentration of the lithium ions contained in the first aqueous electrolyte,
wherein a concentration C1 of the lithium ions contained in the first aqueous electrolyte falls within a range from 1 mol/L to less than 5 mol/L, and
a concentration C2 of the lithium ions contained in the second aqueous electrolyte falls within a range from 5 mol/L to 12 mol/L.

16. The secondary battery according to claim 15,
wherein a ratio C2/C1 of the concentration C2 of the lithium ions contained in the second aqueous electrolyte to the concentration C1 of the lithium ions contained in the first aqueous electrolyte falls within a range from 2 to 11.

17. A secondary battery comprising a positive electrode, a negative electrode, and an aqueous electrolyte,
wherein the aqueous electrolyte includes a first aqueous electrolyte and a second aqueous electrolyte,
the first aqueous electrolyte is in contact with at least part of the positive electrode and contains lithium ions,
the second aqueous electrolyte is in contact with at least part of the negative electrode and contains lithium ions, and
a concentration of the lithium ions contained in the second aqueous electrolyte is higher than the concentration of the lithium ions contained in the first aqueous electrolyte,
the secondary battery further comprising a partition configured to separate the first aqueous electrolyte and the second aqueous electrolyte,
wherein the partition is an ion exchange membrane or a solid electrolyte.

18. The secondary battery according to claim 17, wherein the partition is an ion exchange membrane.

19. The secondary battery according to claim 17, wherein the partition is a solid electrolyte.

* * * * *